(12) United States Patent
Bier

(10) Patent No.: US 7,703,004 B2
(45) Date of Patent: Apr. 20, 2010

(54) SYSTEMS AND METHODS FOR AUTOMATICALLY CONVERTING WEB PAGES TO STRUCTURED SHARED WEB-WRITABLE PAGES

(75) Inventor: Eric A. Bier, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 528 days.

(21) Appl. No.: 10/751,955

(22) Filed: Jan. 7, 2004

(65) Prior Publication Data

US 2004/0261023 A1  Dec. 23, 2004

Related U.S. Application Data

(60) Provisional application No. 60/479,904, filed on Jun. 20, 2003.

(51) Int. Cl.
*G06F 17/00* (2006.01)

(52) U.S. Cl. .................. 715/234; 715/255; 715/760

(58) Field of Classification Search ................ 715/513, 715/760, 762, 780, 530, 234, 255
See application file for complete search history.

(56) References Cited

U.S. PATENT DOCUMENTS

| 6,941,521 | B2 * | 9/2005 | Lin et al. ................ 715/762 |
| 2002/0073125 | A1 | 6/2002 | Bier | |
| 2003/0023632 | A1 * | 1/2003 | Ries et al. ............... 707/513 |
| 2003/0074634 | A1 * | 4/2003 | Emmelmann ............ 715/513 |
| 2003/0093752 | A1 * | 5/2003 | Chen ...................... 714/781 |

OTHER PUBLICATIONS

Chang, Bay-Wei, "In-Place Editing of Web Pages: Sparrow Community-Shared Documents", Oct. 29, 2002; Available online at: http://www2.parc.com/istl/projects/sparrow/doc/ww7/, pp. 1-16.*
Xerox Corporation, "Author's Guide to creating Sparrow Web pages", 2000-2001. Availabel online at: http://sparrow10.parc.xerox.com:8000/sparrow_2.0/doc/sparrow_page_author.html.*
Bier, Eric A. and Pier, Ken. "Sparrow Web: Group-Writable Information on Structured Web Pages." *CHI 2003: New Horizons*, Apr. 5-10, 2003.
U.S. Appl. No. 10/289,531, filed Nov. 5, 2002, Bell et al.
U.S. Appl. No. 10/744,022, filed Dec. 2003, Bell et al.

* cited by examiner

*Primary Examiner*—Rachna S Desai
(74) *Attorney, Agent, or Firm*—Oliff & Berridge PLC

(57) ABSTRACT

A system and method for an automatic conversion of web pages to shared structured web pages. An input web page is augmented with syntactic elements of a server-based software tool to create and customize group-writeable web pages. Sub-regions of the web page that are to be individually-editable items are identified, and syntactic elements are added to show where these editable regions begin and end, and where clickable buttons will appear that trigger the editing of an individual item, the addition of a new item, or other editing features. Also, syntactic elements are added that act as templates for the layout of any item to be added or modified. The conversion process includes parsing the Web page into an intermediate structure, adding information to individual tokens about the structures in which the tokens play a part, and them generating the new page while making one or more final passes through the intermediate structure from beginning to end.

8 Claims, 34 Drawing Sheets

200

Automatic Conversion Of Web Pages
Converting Web pages to structured Web-writable pages is easy with this new invention. This invention reduces the time needed to update Web pages without the user having to worry about manually converting Web pages to a different Web page that supports structured editing from a Web browser.

Procedures          Research   Biz

- PARC How-To-Page          • Publications

- Budget          • Procedure

```
<!DOCTYPE HTML PUBLIC "-//W3C//DTD HTML 4.01 Frameset//EN"
   "http://www.w3.org/TR/html4/frameset.dtd">

<HTML>

<HEAD><TITLE>Automatic Conversion Of Web Pages

<BODY>

<P>

Converting Web pages to structured Web-writable pages is easy with
this new invention. This invention reduces the time needed to update
Web pages without the user having to worry about manually
converting Web pages to a different Web page that supports
structured editing from a Web browser.

<TABLE>

<TR><TH>Procedures

<TH>Research Biz

<TR><TD>

<UL>

<LI>PARC How-To-Page

<LI>Budget

<TD>

<UL>

<LI>Publications

<LI>Procedure
```

Automatic Conversion Of Web Pages
Converting Web pages to structured Web-writable pages is easy with this new invention. This invention reduces the time needed to update Web pages without the user having to worry about manually converting Web pages to a different Web page that supports structured editing from a Web browser.

Procedures					Research   Biz

▶ PARC How-To-Page			▶ Publications

▶ Budget					▶ Procedure

```
<!DOCTYPE HTML PUBLIC "-//W3C//DTD HTML 4.01 Frameset//EN"
  "http://www.w3.org/TR/html4/frameset.dtd">
<HTML>
<HEAD><TITLE>Automatic Conversion Of Web Pages</TITLE>
</HEAD>
<BODY>
<P>
Converting Web pages to structured Web-writable pages is easy with
this new invention. This invention reduces the time needed to update
Web pages without the user having to worry about manually
converting Web pages to a different Web page that supports
structured editing from a Web browser.
</P>
<TABLE>
<TR><TH>Procedures</TH>
<TH>Research Biz</TH>
<TR><TD>
<UL>
<LI>PARC How-To-Page
<LI>Budget
</UL>
</TD>
<TD>
<UL>
<LI>Publications
<LI>Procedure
</UL>
</TD>
</TABLE>
</BODY>
</HTML>
```

| My Table Title |
|---|
| The quick brown fox |

Fig. 28

```
<HTML>
<BODY>

<table width="95%">
<tr><td>My Table Title<tr><td>
<tr><td>The quick brown fox<tr><td>
</table>

</BODY>
</HTML>
```
— 710

```
<HTML>
<BODY>

<table width="95%">
<tr><td bgcolor="yellow">My Table Title<tr><td>
<tr><td>The quick brown fox<tr><td>
</table>

</BODY>
</HTML>
```
— 711

```
<HTML>
<BODY>

<table width="95%">
<tr><td>My Table Title<tr><td>
<tr><td>The quick <a href="brown.html">brown</a> <img src="fox.gif"> fox<tr><td>
</table>

</BODY>
</HTML>
```
— 712

| ▶ | My Table Title |
| ▶ | The quick brown fox |

Fig. 30

SYSTEMS AND METHODS FOR AUTOMATICALLY CONVERTING WEB PAGES TO STRUCTURED SHARED WEB-WRITABLE PAGES

This non-provisional application claims the benefit of U.S. Provisional Application No. 60/479,904, filed Jun. 20, 2003.

BACKGROUND OF THE DISCLOSURE

1. Field of Invention

This invention generally relates to systems and methods for managing web pages.

2. Description of Related Art

Creating and updating web pages, managed and created by page authors, may rely on systems that support group work by allowing group members to view and modify shared information from their individual workstations. Group members may be required to install several types of software tools, where each tool manages a different type of information, in order to share group context that is needed to perform group activities. Therefore, group members require training to understand each tool. Since each tool often runs a separate window, group members must also manage limited screen space while copying content between applications.

There has been other work on recognizing structures in HTML. For example, a number of authors have described work on extracting information from tables and lists in HTML documents. However, these systems focus on extracting information from web pages for use in databases and data mining, while this invention uses the extracted information instead for the automatic construction of Web-writeable pages.

There are many existing approaches to keeping web pages up to date. A user, page author or group member can use a direct manipulation web page editor, such as, for example, Microsoft's FrontPage® or Macromedia's Dreamweaver®, a collaboration server, such as, for example, Wiki®, or a database-driven web application builder, such as, for example, Zope®. However, all of these approaches either require leaving the web browser used to access or view the web page, require learning a mark-up language and/or the like, cause access and version control problems and/or require writing custom software. Sparrow Web, which is a web page managing tool available from Xerox, provides an attractive alternative, particularly for authors who need to make frequent small changes to pages, or for group members who share responsibility for updating and/or managing a web page.

SUMMARY OF THE INVENTION

Sparrow Web is a server-based software tool that allows group-writeable web pages to be created and customized. Before this invention, converting standard web pages in HTML format to group-writeable Sparrow Web type pages was largely a manual process. The page author would need to read the reference manual describing the syntactic elements that need to be added to a standard web page to convert the standard web page to a Sparrow Web type page, and then add those syntactic elements using a text editor or HTML editor. Alternatively, if a Sparrow Web type page with the appropriate layout and structure was available, the page author could use Sparrow Web's copy page feature to make a new Sparrow Web type page with that layout and structure. The page author could then copy the content, one item at a time, into that new Sparrow Web type page from the source web page that was being converted.

Although Sparrow Web supports structured editing of web pages from a web browser by multiple users simultaneously, updating and converting standard web pages to Sparrow Web type pages or equivalent web pages was difficult.

This invention provides systems and methods that permit a web page to be automatically converted into a Sparrow Web type page.

This invention separately provides systems and methods that reduce the cost of keeping web pages up to date.

This invention separately provides systems and methods that allow a web page to be automatically augmented with additional syntactic elements to conform to a format standard.

This invention separately provides systems and methods that allow a web page to be automatically augmented with additional syntactic elements to conform to a format required by a Sparrow Web type page.

This invention separately provides systems and methods that allow a web page to be automatically separated into editable items.

This invention separately provides systems and methods that determine the beginning and end of an editable item.

This invention separately provides systems and methods that determine which parts of the editable item are editable and which parts are fixed.

This invention separately provides systems and methods that emit the content of the resulting Sparrow Web type page.

This invention separately provides systems and methods that determine the beginning and ending of a sequence (region) of editable items.

In various exemplary embodiments of the systems and methods according to this invention, web pages are augmented with additional syntactic elements that identify editable regions, specify layout templates, and/or provide clickable buttons that invoke the updating functions.

In various exemplary embodiments of the systems and methods according to this invention, an input Web page in an HTML format is augmented with Sparrow Web syntactic elements and a new output HTML page is produced. In particular, sub-regions of the input Web page that are to be individually-editable items are identified. Syntactic elements are added that show where these editable regions begin and end, and that show where clickable buttons will appear that trigger the editing of an individual item, the addition of a new item, or other editing features.

In various exemplary embodiments of the systems and methods according to this invention, the added syntactic elements act as templates for the layout of any item that will be added or modified. In various exemplary embodiments of the systems and methods according to this invention, a web-based user interface allows the user to specify what kinds of page elements to make editable and how items should be formatted by the system. The kinds of page elements that can become editable items include list items, table rows, text paragraphs, etc.

In various exemplary embodiments of the systems and methods according to this invention, converting the input web page to the new output HTML page includes parsing the web page into an intermediate structure, adding information to individual tokens about the structures in which such tokens play a part, and then generating the new web page during one or more final passes through the intermediate structure from beginning to end.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the following figures, wherein:

FIG. 2 illustrates an exemplary standard web page;

FIG. 3 illustrates one exemplary embodiment of HTML code usable to provide the web page shown in FIG. 2;

FIG. 4 illustrates one exemplary embodiment of a Sparrow Web type web page converted from the web page show in FIG. 2 according to this invention;

FIG. 5 illustrates one exemplary embodiment of an augmented version of the HTML code of FIG. 3, usable to provide the web page shown in FIG. 4;

FIG. 28 illustrates an exemplary standard web page;

FIG. 29 illustrates one exemplary embodiment of HTML code usable to provide the web page shown in FIG. 28;

FIG. 30 illustrates one exemplary embodiment of a Sparrow Web type web page converted from the web page show in FIG. 28 according to this invention;

DETAILED DESCRIPTION OF EXEMPLARY EMBODIMENTS

In various exemplary embodiments of the systems and methods according to this invention, a labor-intensive process of converting web pages into Sparrow Web pages is at least partly automated so that this conversion can be done, for example, simply by filling in a web form displayed by the browser. A more attractive way to open up web pages and web sites for rapid structured editing by both individuals and groups is provided by allowing users editing the web page to view the editable elements of the page in a window of the browser without seeing the underlying page-defining code, such as the HTML code, that defines the page, and without the need to specify the format of the element so that the user can focus on updating the content of the element. The various exemplary systems and methods according to this invention also allow one or more members of a group to annotate a web page or collection of web pages on an accessible site on a network simply by making a converted copy of the web page for the private use of the user or group.

In various exemplary embodiments according to this invention, a web-based user interface allows the user to specify what kinds of page elements, including, for example, list items, table rows, and/or text paragraphs, to make editable and how such page elements or items should be formatted. As discussed below in greater detail, an input web page defined using HTML code produces a new output HTML page, augmented with Sparrow Web syntactic elements. This new output HTML page is created by identifying sub-regions of the page that are to be made into individually-editable items, and by adding syntactic elements that show where these editable regions begin and end, and that define where selectable buttons will appear that trigger the editing of an individual item, the addition of a new item, and/or any other desired editing feature. Syntactic elements that act as templates for the layout of items, that will be added or modified, can also be added. Further, as discussed in greater detail below in various exemplary embodiments, the conversion process includes parsing the web page into an intermediate structure, adding information to individual tokens about the structures in which such individual tokens play a part, and then generating the new page while making one final pass through the intermediate structure from beginning to end.

The following detailed discussion is directed to specific types of applications, namely tables, lists and paragraph editing, with which the conversion systems and methods according to this invention are usable. However, it should be appreciated that this is for ease of understanding and familiarity only, and should not be interpreted as limiting the types of applications with which the systems and methods according to this invention are usable.

Figure 1:
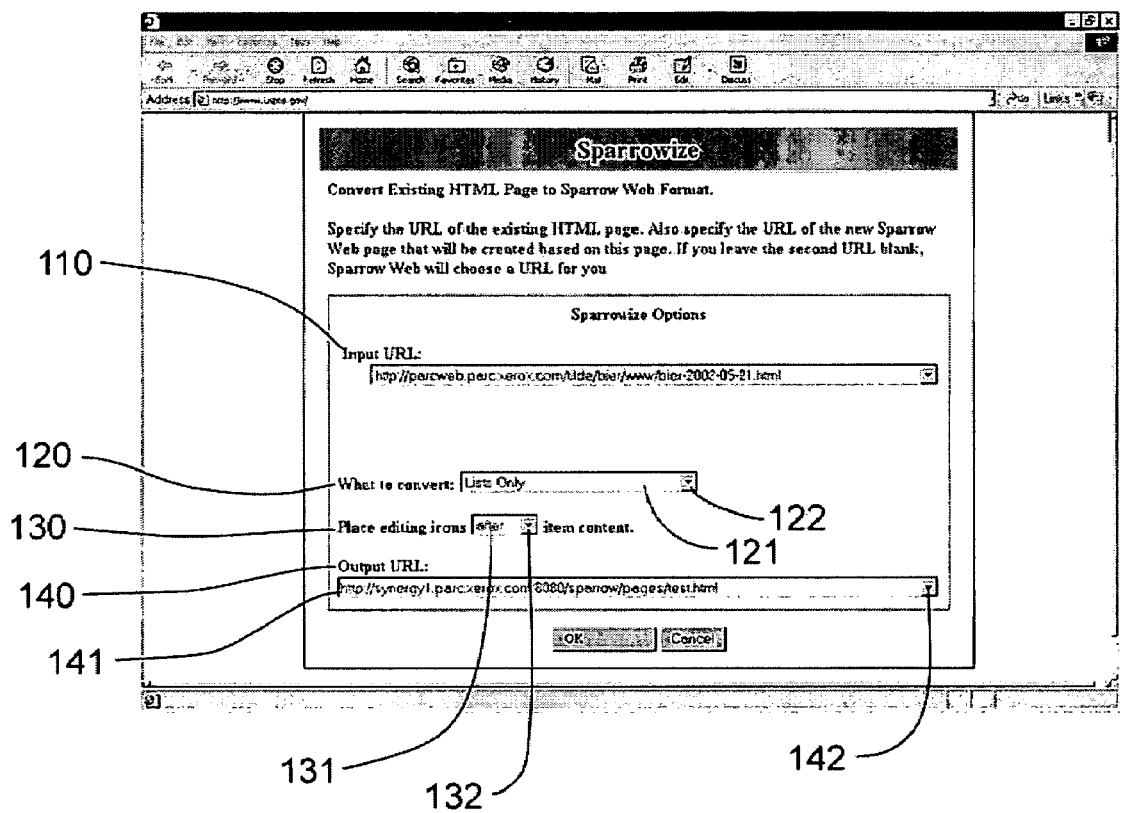
FIG. 1 illustrates one exemplary embodiment of a graphical user interface usable to identify a web page to be converted according to this invention.

FIG. 1 illustrates one exemplary embodiment of a graphical user interface, browser display or window 100 that is usable to display user selectable options for converting a standard web page into a group-writeable web page. The window 100 includes a source web page identifying portion 110, a conversion element type identifying portion 120, an editing icon placement identifying portion 130 and an output web page identifying portion 140.

The conversion element type identifying portion 120 includes a selectable icon 122 that opens up a pull-down menu that lists the types of structures that can be converted into editable items by the exemplary system of this invention. The types of structures include, but are not limited to lists, tables and paragraphs. If the user selects one of the listed structures, the selected structure is displayed in the second user input portion 121 to identify the types of structures to be converted into editable items.

The editing icon placement identifying portion 130 includes a selectable icon 132 that opens up a pull-down menu that lists the various locations to place the editing icons in the output web page. The various locations include, but are not limited to, placement before and placement after the item contents. If the user selects one of the listed locations, the selected location is displayed in the third user input portion 131 to identify the location for placing editing icons in the output web page.

The output web page identifying portion 140 includes a fourth user input portion 141 where the user can type or cut and paste the address of an output web page created by the exemplary system of this invention. The text entered by the user will be used as an address for the output web page.

FIG. 2 illustrates one exemplary embodiment of a standard web page 200 used as the input or source document. First, standard web page 200 includes a heading portion that includes, but is not limited to, a title. Next, standard web page 200 includes a paragraph portion. Standard web page 200 further includes a table with two rows and two columns. The first row of the table contains table headings. The second row contains two columns including lists. Each list includes two bulleted list items. It should be appreciated that the exemplary standard web page 200 may include many variations in form.

FIG. 3 illustrates an exemplary embodiment of source code 300 that can be used to create the exemplary standard web page 200 of FIG. 2. The lines of code include: optional HTML document structure tags identifying the document as an HTML document and specifying the HTML version; an HTML document structure tag, <HTML>, indicating the beginning of the HTML document; an HTML document structure tag, <HEAD>, indicating the beginning of introductory information about the HTML document, i.e. title; an HTML document structure tag, <BODY>, indicating the beginning of the main portion of the HTML document; a basic HTML tag, <P>, indicating the beginning of a paragraph of text; a basic HTML tag, <TABLE>, indicating the beginning of a table format; basic HTML tags, <TR>, indicating the beginning of a table row item; a basic HTML tag, <TH>, indicating the beginning of a table heading; basic HTML tags, <TD>, indicating the beginning of a table data cell; basic HTML tags, <UL>, indicating the beginning of an unordered (bulleted) list; and basic HTML tags, <LI>, indicating each list item It should be appreciated that the source code 300 includes, but is not limited to, HTML code.

FIG. 4 illustrates one exemplary embodiment of a Sparrow Web type page 400 converted from the standard web page 200 shown in FIG. 2. Sparrow Web page 400 is similar in appearance to standard web page 200 with the exception of the selectable icons substituted in place of the bullets located before the list items. Further, Sparrow Web type page also has additional selectable icons allowing new items to be added. It should be appreciated that selectable icons include various embodiments, such as, but not limited to triangle and plus sign (+) shaped icons. It should also be appreciated that the additional selectable icons can also be used to add additional items to other structures including, but not limited to, paragraphs and tables. It should be appreciated that the Sparrow Web type page 400 may include many variations in form.

FIG. 5 illustrates an exemplary embodiment of the augmented source code 500 that is augmented by the exemplary system of this invention to place the original source code 300 of FIG. 3 in conformance to a coding standard. FIG. 5 is similar in appearance to original source code 300 with the exception of the highlighted items. The highlighted items include the tags added to the source code 300 of the exemplary standard web page 200. For example, the </TITLE> and </HEAD> end tags in the augmented source code 500 were added to the original source code 300, because these tags were missing in the original source code 300. Although, in this exemplary embodiment of the augmented source code 500 only missing end tags were added, it should be appreciated that augmented source codes can also include missing beginning tags. Further, it should be appreciated that the augmented source code 500 includes, but is not limited to, HTML code.

Figure 6:
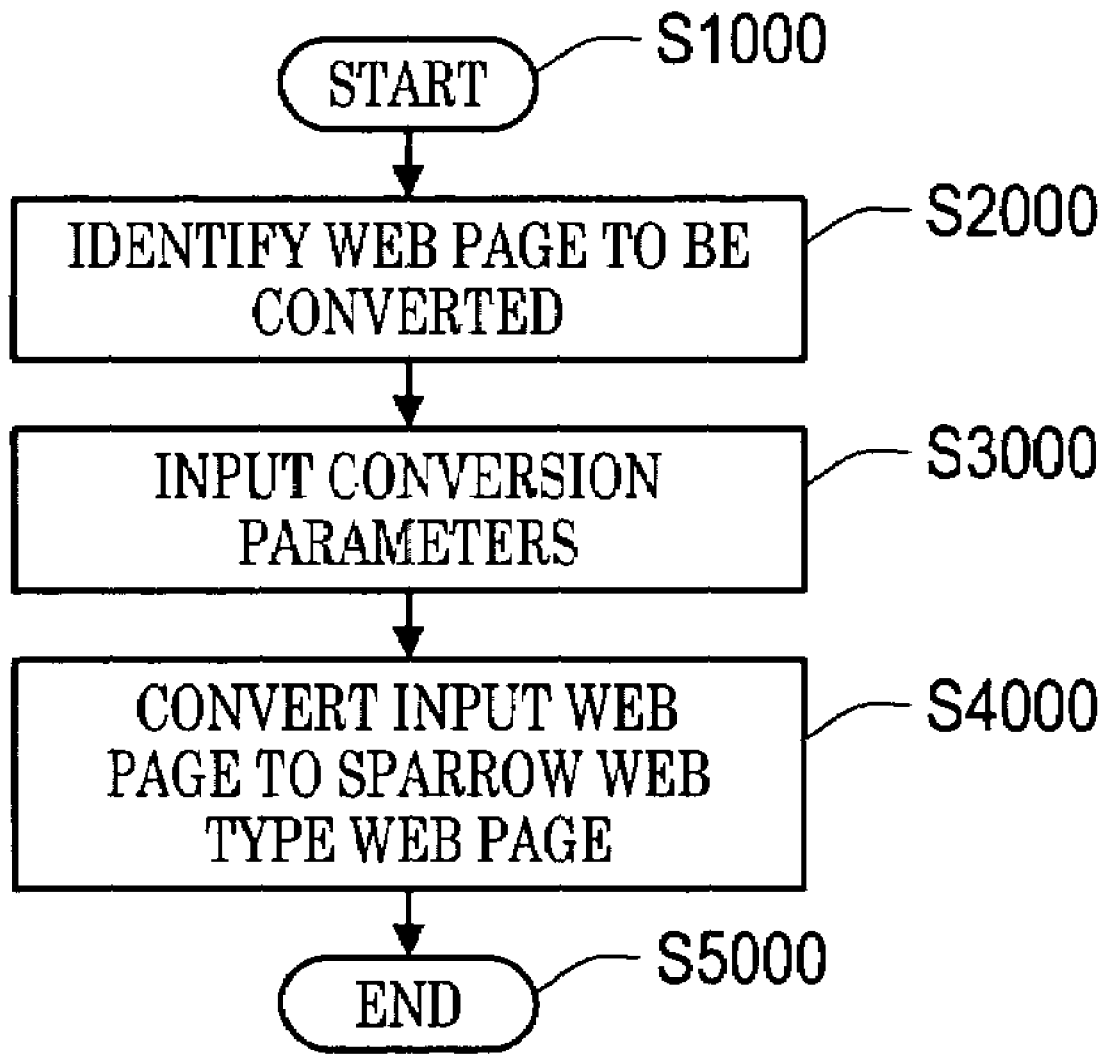
FIG. 6 is a flowchart outlining one exemplary embodiment of a method for converting a standard web page into an on-line editable web page.

FIG. 6 is a flowchart outlining one exemplary embodiment of the method for converting a standard web page into an on-line editable web page. As shown in FIG. 6, operation of the method begins in step S1000, and continues to step S2000, where the web page to be converted is identified. Then, in step S3000, the conversion parameters are inputted. Next, in step S4000, the input web page is converted into a Sparrow Web type page. Operation of the method then continues to step S5000, where operation of the method ends.

Figure 7:
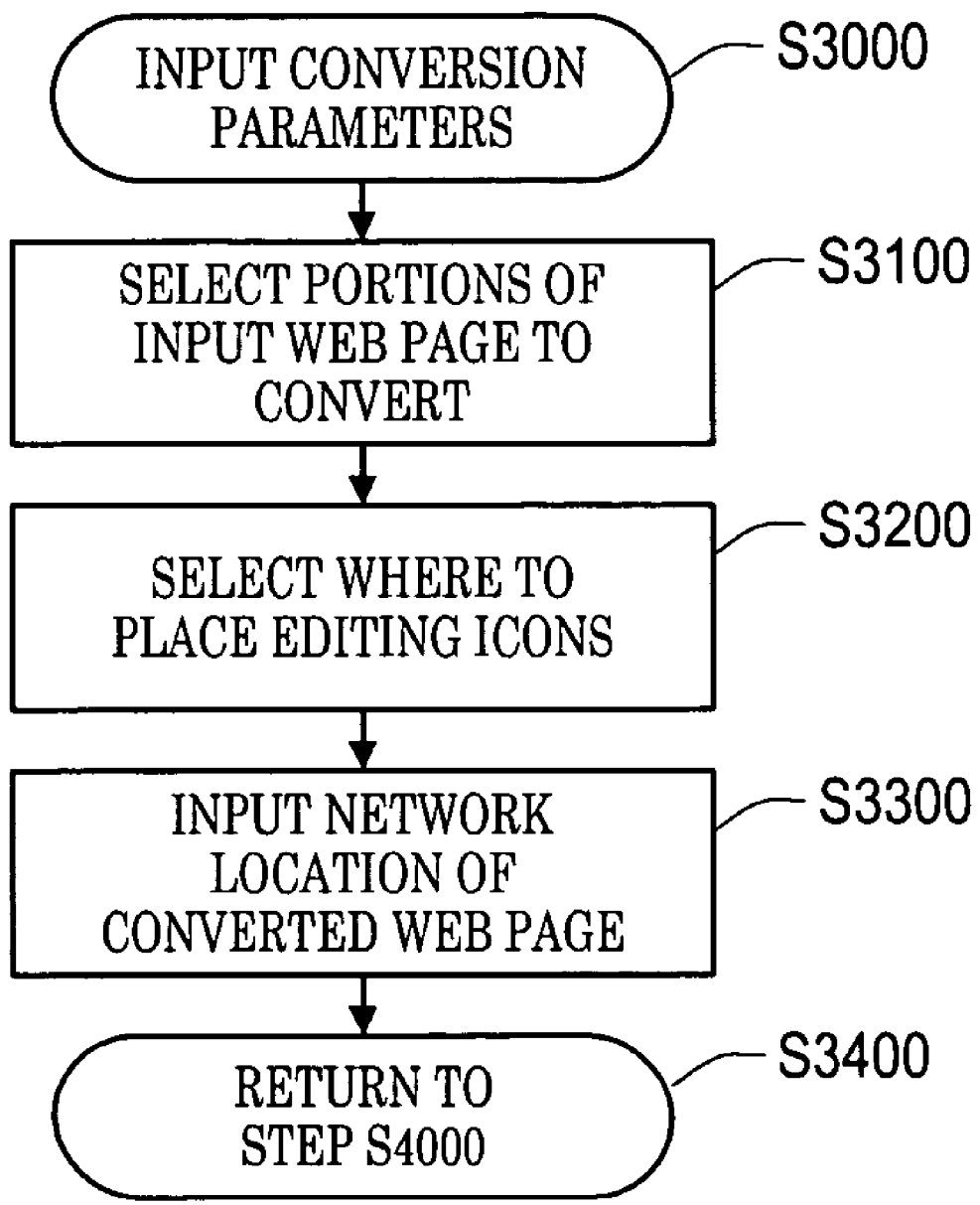
FIG. 7 is a flowchart outlining in greater detail one exemplary embodiment of the method for inputting conversion parameters of FIG. 6 according to this invention.

FIG. 7 is a flowchart outlining in greater detail one exemplary embodiment of the method for inputting conversion parameters of FIG. 6 in accordance with this invention. As shown in FIG. 7, operation of the method begins in step S3000, and continues to step S3100, where one or more portions of the input web page to be converted are selected. Then, in step S3200, the location of where to place editing icons is selected. Next, in step S3300, the network location of the converted web page is input. Operation of the method then continues to step S3400, where operation of the method returns to step S4000.

Figure 8:
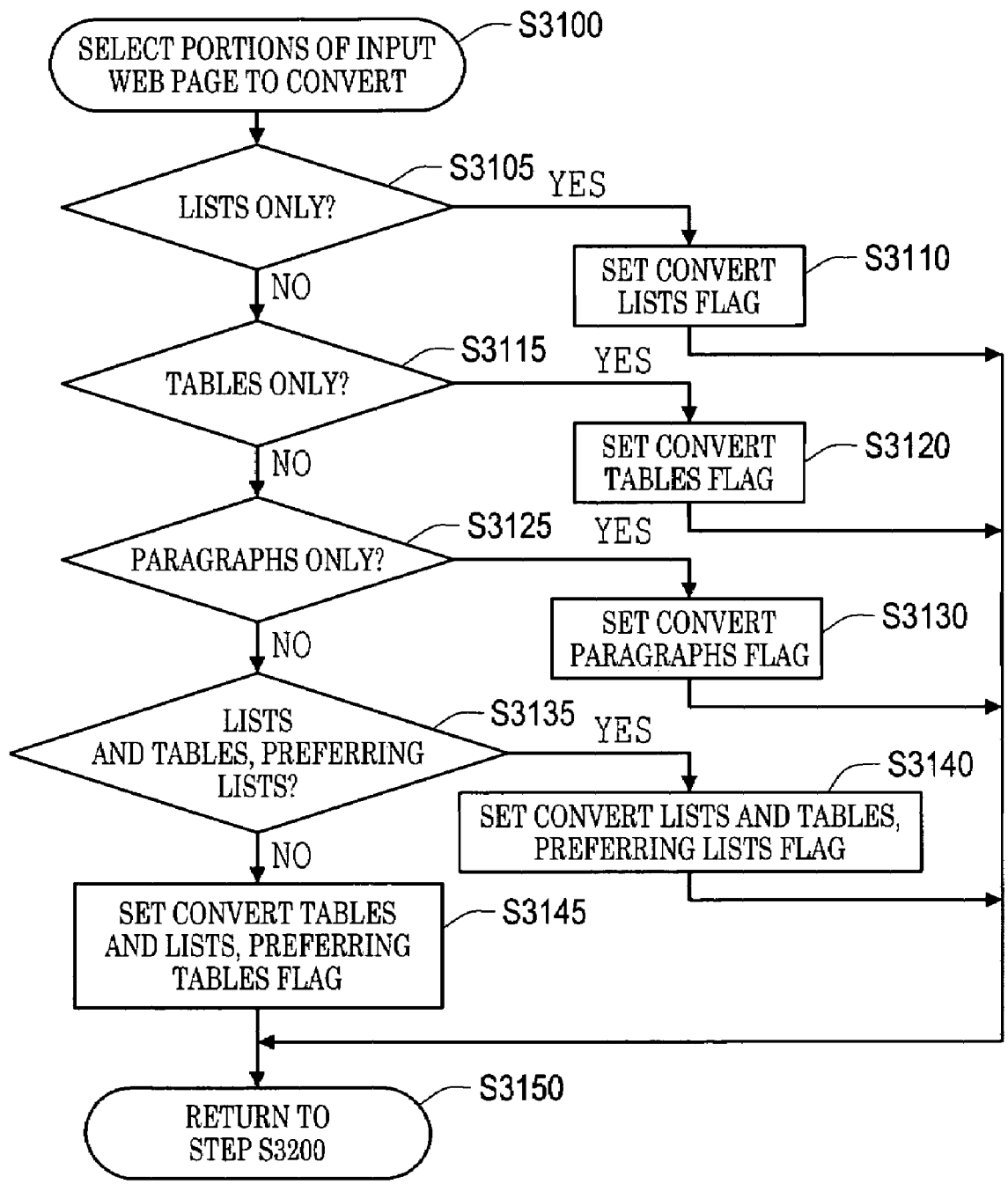
FIG. 8 is a flowchart outlining in greater detail one exemplary embodiment of the method for selecting portions of an input web page to convert of FIG. 7 according to this invention.

FIG. 8 is a flowchart outlining in greater detail one exemplary embodiment of the method for selecting portions of an input web page to convert of FIG. 7 according to this invention. As shown in FIG. 8, operation of the method begins in step S3100, and continues to step S3105, where a determination is made whether only lists are to be converted. If so, operation continues to step S3110. Otherwise, operation jumps to step S3115.

In step S3110, a convert lists flag is set, and operation continues to step S3150. In contrast, in step S3115, a determination is made whether only tables are to be converted. If so, operation continues to step S3120. Otherwise, operation jumps to step S3125.

In step S3120, a convert tables flag is set, and operation continues to step S3150. In contrast, in step S3125, a determination is made whether only paragraphs are to be converted. If so, operation continues to step S3130. Otherwise, operation jumps to step S3135.

In step S3130, a convert paragraphs flag is set, and operation continues to step S3150. In contrast, in step S3135, a determination is made whether both lists and tables are to be converted, with a preference for lists. If so, operation continues to step S3140. Otherwise, operation jumps to step S3145.

In step S3140, a convert lists and tables, preferring lists flag is set, and operation continues to step S3150. In contrast, in step S3145, a tables and lists, preferring tables flag is set to indicate that both tables and lists are to be converted, with a preference for tables. Operation then continues to step S3150, where operation returns to step S3200.

Figure 9:
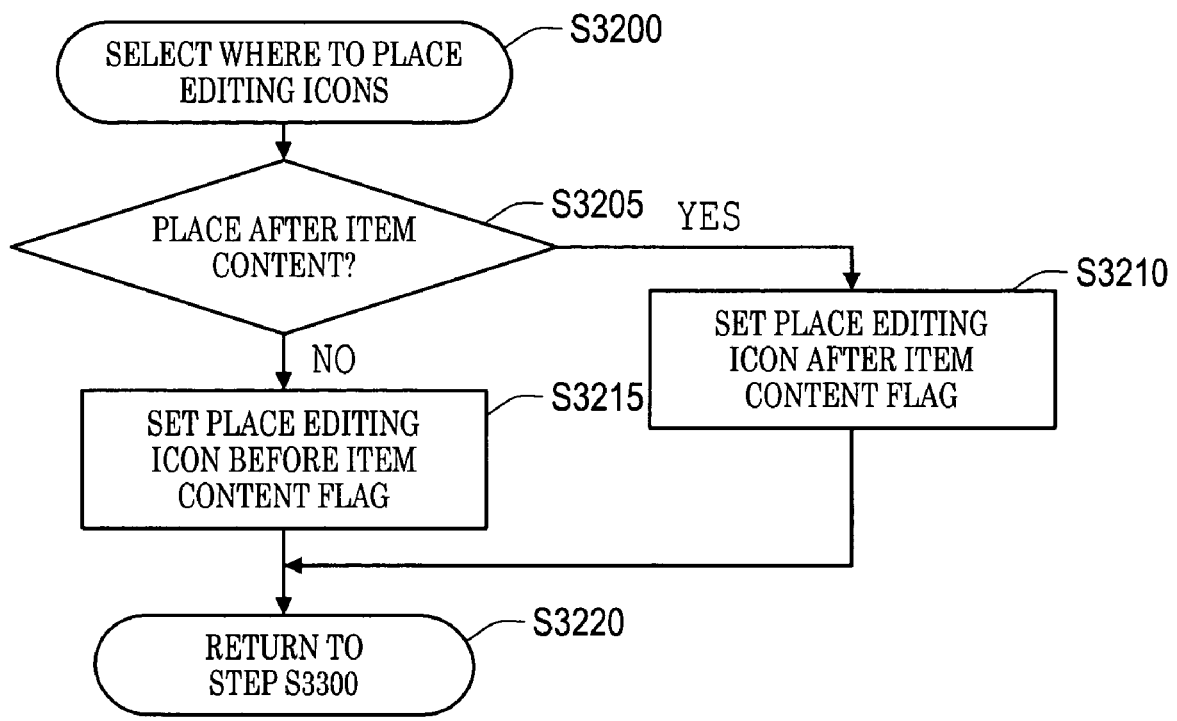
FIG. 9 is a flowchart outlining in greater detail one exemplary embodiment of the method for selecting where to place editing icons of FIG. 7 according to this invention.

FIG. 9 is a flowchart outlining in greater detail one exemplary embodiment of the method for selecting where to place editing icons of FIG. 7 according to this invention. As shown in FIG. 9, operation of the method begins in step S3200, and continues to step S3205, where a determination is made whether to place the editing icon after the item content. If so, operation continues to step S3210. Otherwise, operation jumps to step S3215.

In step S3210, a place editing icon after the item content flag is set, and operation continues to step S3220. In contrast, in step S3215, a place editing icon before the item content flag is set. Operation then continues to step S3220, where operation returns to step S3300.

As discussed above with respect to FIGS. 2-4, web pages that conform to the HTML standard will have <HTML> and </HTML> tags surrounding most or all of the content of the page. Inside of the "HTML" tags, the <HEAD> and </HEAD> tags are included. Furthermore, the <BODY> and </BODY> tags are included after the "HEAD" tags and inside of the "HTML" tags. The HEAD tags contain overall meta information about the page, such as, for example, the page title, key words, JavaScript® function definitions, and the like. The BODY tags contain the actual visible content of the page, FORM tags, buttons, and other elements. However, not all displayable web pages conform to the HTML standard.

Some displayable web pages leave off or are missing the HTML, HEAD, and BODY tags altogether. Some web pages have some of these tags, but are missing other tags. For example, some web pages have a <HEAD> tag with no matching </HEAD> tag, a </HEAD> tag with no matching <HEAD> tag, and the like.

In order to place some additional information in the HEAD section of the page and some in the BODY section, in various exemplary embodiments, the systems and methods of this invention finds these sections or regions and adds one or more missing tags, as needed, to bring these important parts of the web page into conformance with the HTML standard.

Figure 10:
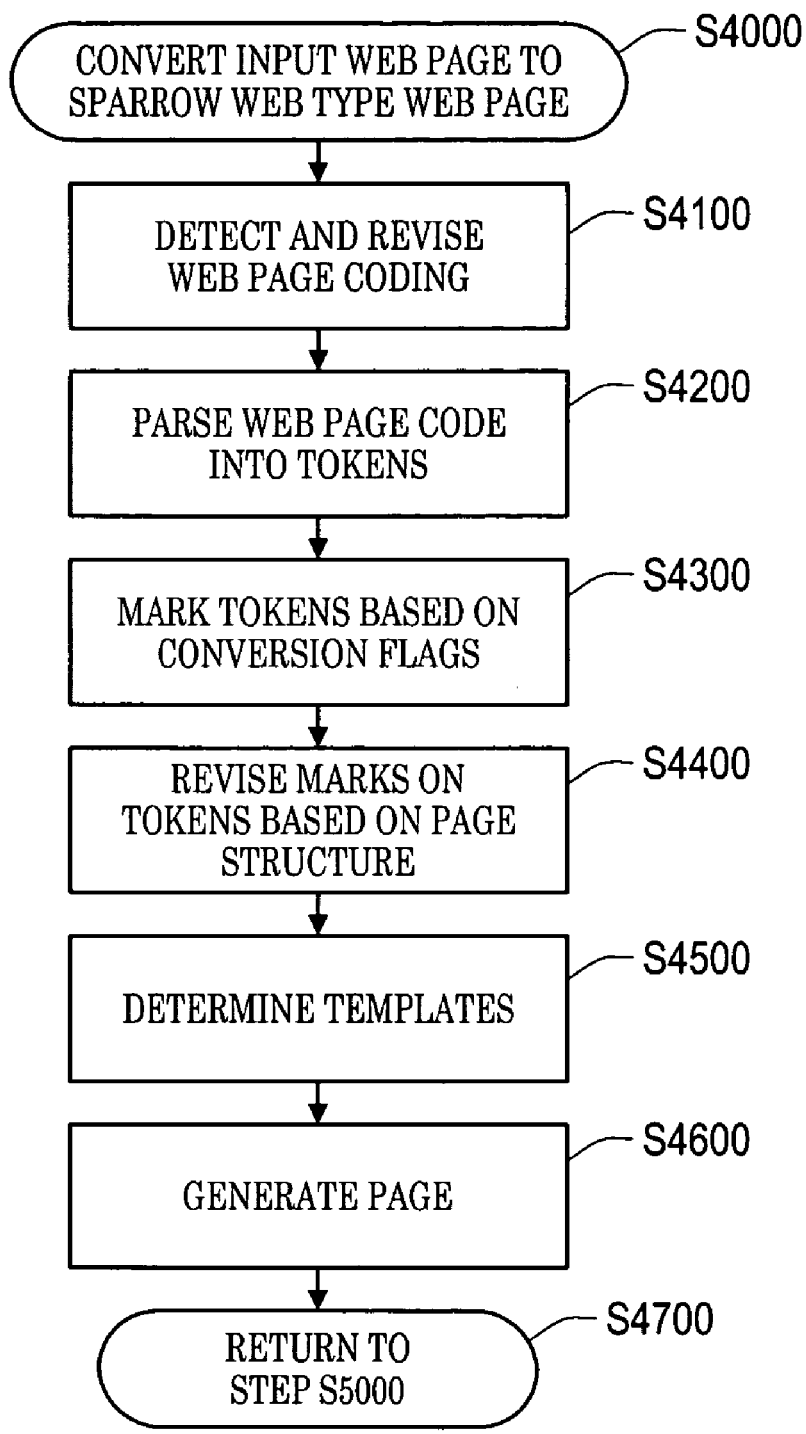
FIG. 10 is a flowchart outlining in greater detail one exemplary embodiment of the method for converting input web pages to Sparrow Web type pages of FIG. 6 according to this invention.

FIG. 10 is a flowchart outlining in greater detail one exemplary embodiment of the method for converting input web pages to Sparrow Web type web pages according to this invention. As shown in FIG. 10, operation of the method begins in step S4000, and continues to step S4100, where the web page coding is detected and revised. Then, in step S4200, the revised web page code is parsed into tokens. Next, in step S4300, some tokens in the parsed revised web page code are marked as candidates to be included in editable regions based on the settings of the conversion flag(s). Operation then continues to step S4400.

In step S4400, marks on some tokens are revised based on the structure of the Web page, i.e. to indicate non-editable items in cases where these tokens should not be included in editable regions. Then in step S4500, the templates for editable items are determined based on the marked tokens. Finally, in step S4600, the new page is generated. Operation then continues to step S4700, where operation returns to step S5000.

Figure 11:
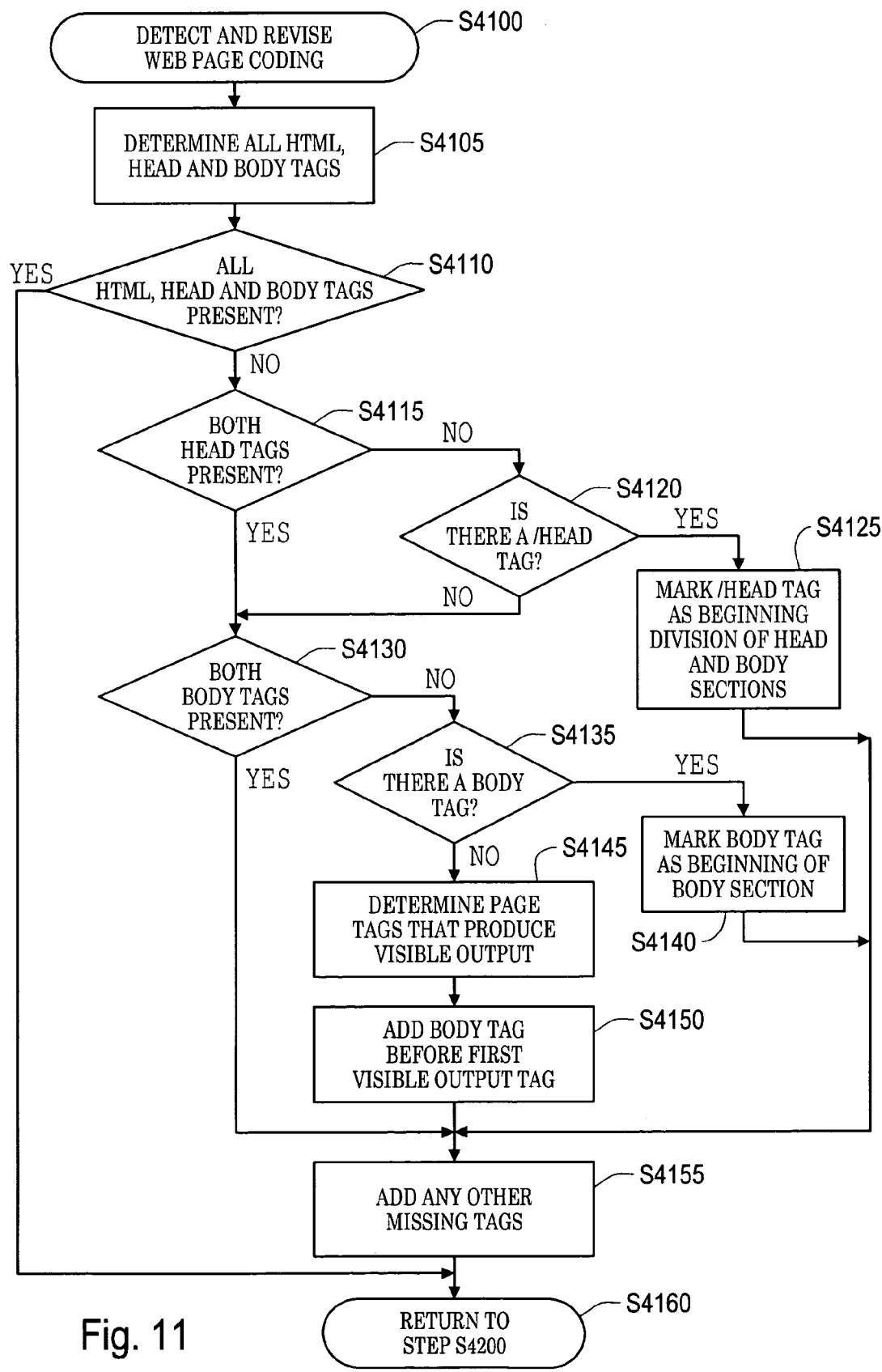
FIG. 11 is a flowchart outlining in greater detail one exemplary embodiment of the method for detecting and revising web page format coding of FIG. 10 according to this invention.

FIG. 11 is a flowchart outlining in greater detail one exemplary embodiment of the method for detecting and revising the web page coding of FIG. 10 according to this invention. It should be appreciated that FIG. 11 is particularly directed to HTML coding. Thus, it should be appreciated that, if the web page being converted was coded using some other language, such as XML, SGML, XHTML or any other know or later-developed language that is usable to code a web page, FIG. 11 will be modified in view of the specifics of that language.

As shown in FIG. 11, operation of the method begins in step S4100, and continues to step S4105, where all HTML, HEAD and BODY open and close tags are determined. Then, in step S4110, a determination is made whether all HTML, HEAD and BODY open and close tags are present. If all six tags are present, then operation jumps to step S4160 because these tags are well-formed and there is no further work that must be done. Otherwise, operation continues to step S4115, where a determination is made whether both HEAD tags are present. If so, operation jumps to step S4130. Otherwise, our operation continues to step S4120.

In step S4120, a determination is made whether a /HEAD tag is present. If so, operation continues to step 4125, where the end of this tag is used to identify the beginning of the division between the HEAD and BODY sections. This identified division is used later, in the case that the start BODY tag is missing, as the location for the insertion of a new start BODY tag. Operation then jumps to step S4155. In contrast, in step S4130, a determination is made whether both BODY tags are present. If so, operation jumps to step S4155. Otherwise, operation continues to step S4135.

In step S4135, a determination is made whether a BODY tag is present. If so, operation continues to step S4140, where the beginning of this tag is used as the beginning of the BODY section. Operation then again jumps to step S4155. In contrast, in step S4145, one or more page tags that will produce visible output are determined by scanning through the tags of the page. Then, in step S4150, the missing BODY tag is added right before the first visible output tag. Next, in step S4155, any other missing tags are added as required. Operation then continues to step S4160, where operation returns to step S4200.

It should be appreciated that, for HTML, tokens that produce visible output include, but are not limited to, tokens including non-empty text strings and tags that are not on a list of predetermined invisible tags. It should be appreciated that, for HTML, the list of invisible tags includes, but is not limited to: HEAD, SCRIPT, TITLE, META, HTML, STYLE, and XML beginning and end tags.

Figure 12:
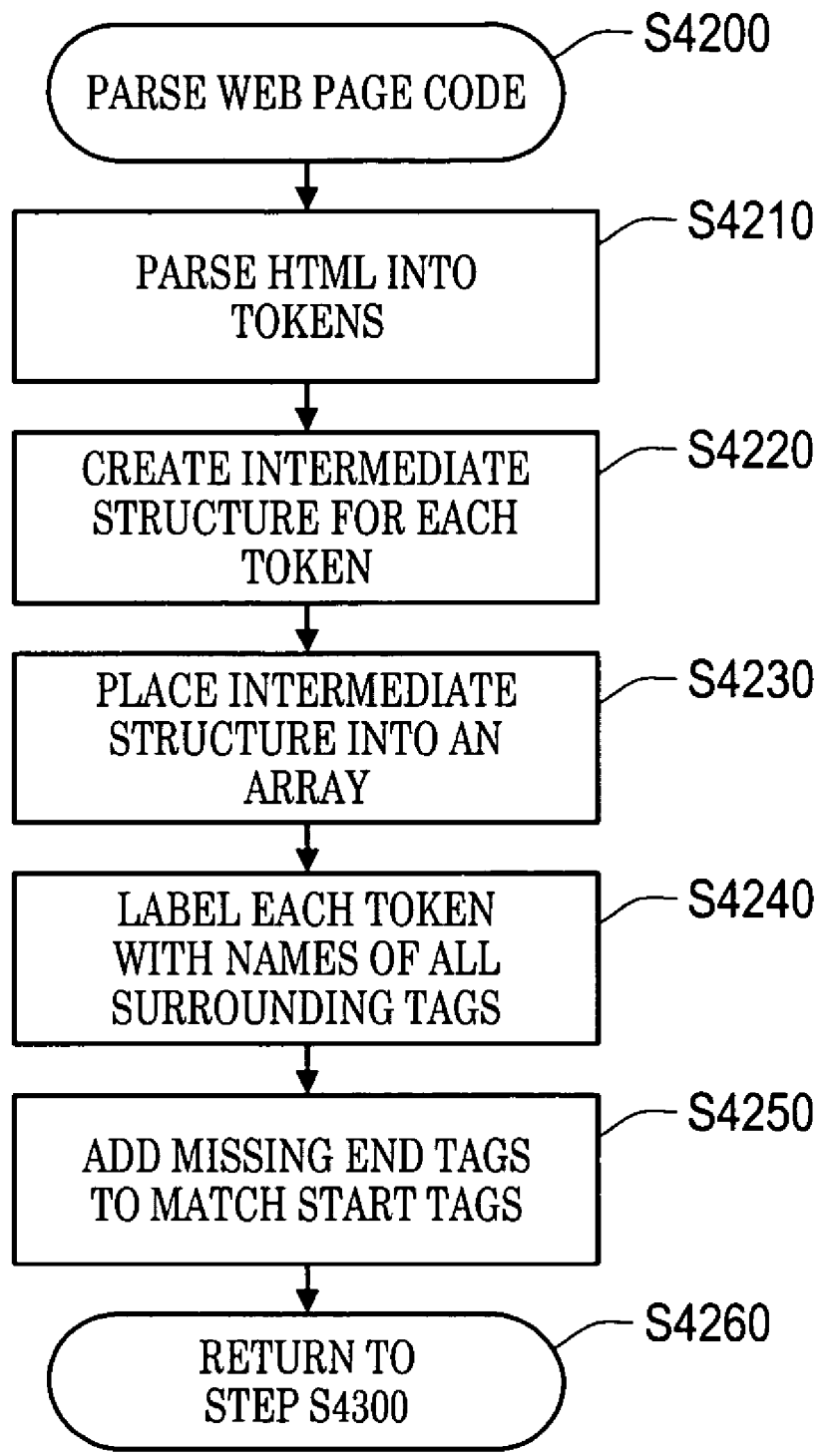
FIG. 12 is a flowchart outlining in greater detail one exemplary embodiment of the method for parsing the web page code of FIG. 10 according to this invention.

FIG. 12 is a flowchart outlining in greater detail one exemplary embodiment of the method for parsing the web page code of FIG. 10 in accordance with the invention. As shown in FIG. 12, operation of the method begins in step S4200, and continues to step S4210, where the HTML tags are parsed into tokens. Then, in step S4220, an intermediate structure is created for each token. Next, in step S4230, the intermediate structures are placed into an array. The intermediate data structure of a token will also be referred to as "the token" in the following discussion. Operation then continues to step S4240.

In step S4240, each token is labeled with the names of all of the tags that surround the given token. For example, in the HTML fragment "<b><i>Hello</i></b>", the text token "Hello" is labeled with the context "b/i", meaning that it is inside of an "i" tag, which in turn is inside of a "b" tag. Next, in step S450, missing end tags are added to match any start tags for which the closing tag is optional in the HTML standard. For example, in various exemplary embodiments of the systems and methods of this invention, any open <P> tags are closed when another <P> tag is encountered or when a <TABLE> tag is encountered. Similarly, any <LI> tags are closed when another <LI> tag is encountered, or when a list begins or ends. Additionally, any <TD> tags are closed when another <TD> tag is encountered, or when a table row begins or ends. Operation then continues to step S4260, where operation of the method returns to step S4300.

Figure 13:
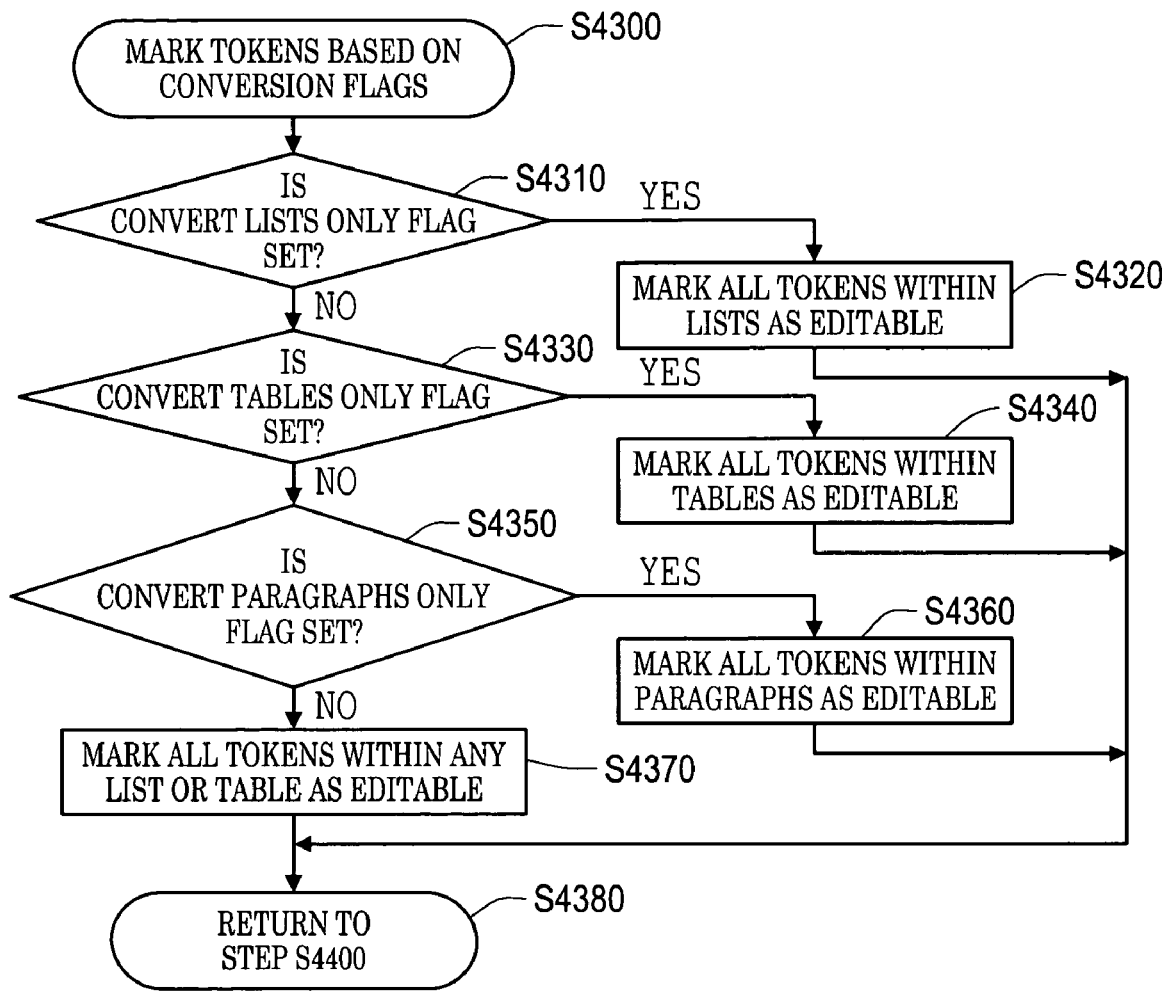
FIG. 13 is a flowchart outlining in greater detail one exemplary embodiment of the method for marking tokens of FIG. 10 according to this invention.

FIG. 13 is a flowchart outlining in greater detail one exemplary embodiment of the method for marking web page tokens based on the conversion flag(s) of FIG. 10 according to this invention. As shown in FIG. 13, operation of the method begins in step S4300, and continues to step S4310, where a determination is made whether the convert list only flag is set. If so, operation continues to step S4320. Otherwise, operation jumps to step S4330.

In step S4320, any tokens that are contained between the start tag and end tag of an HTML list (including the start and end tags themselves) are marked as editable. These marks are not final, and may be removed by later processing stages. Operation then jumps to step S4380. In contrast, in step S4330, a determination is made whether the convert tables only flag is set. If so, operation continues to step S4340. Otherwise, operation jumps to step S4350. In step S4340, any tokens that are contained between the start tag and end tag of an HTML table (including the start and end tags themselves) are marked as editable. These marks are not final, and may be removed by later processing stages. Operation then again jumps to step S4380.

In step S4350, a determination is made whether the convert paragraphs only flag is set. If so, operation continues to step S4360. Otherwise, operation jumps to step S4370. In step S4360, any tokens contained between the start tag and end tag of an HTML paragraph (including the start and end tags themselves) are marked as editable. These marks are not final, and may be removed by later processing stages. Operation then again jumps to step S4380. In contrast, in S4370, any tokens that are contained between the start and end tag of either an HTML list or an HTML table (including the start and end tags themselves) are marked as editable. Again, these marks are not final. This step is performed both in the case where the convert lists and tables, preferring lists flag is set and in the case where the convert tables and lists, preferring tables flag is set. Operation then again jumps to S4380, where operation of the method returns to step S4400.

It should be appreciated that, although step S4370 marks any tokens that are contained between the start and end tag of either an HTML list or an HTML table as editable, any tokens between the start and end tag of an HTML paragraphs can also be marked as editable. Further, it should be appreciated that, in step S4370, any token between any combination of an HTML list, HTML table and/or HTML paragraph can be marked editable if desired.

Figure 14:
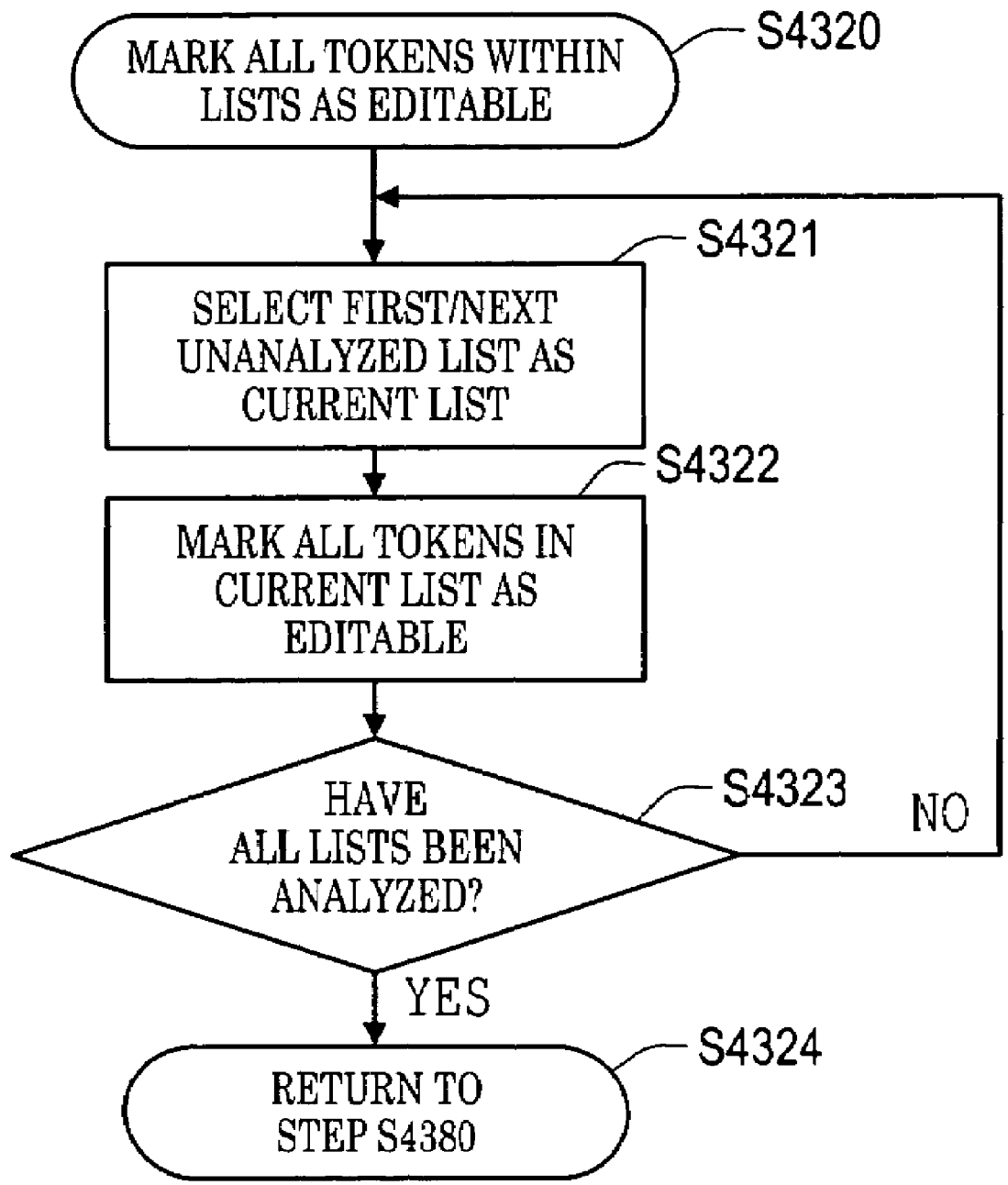
FIG. 14 is a flowchart outlining in greater detail one exemplary embodiment of the method for marking all tokens within lists of FIG. 13 according to this invention.

FIG. 14 is a flowchart outlining in greater detail one exemplary embodiment of the method of FIG. 13 for marking all tokens within lists as editable in accordance to this invention. As shown in FIG. 14, operation of the method begins in step S4320, and continues to step S4321, where a first or next list in the web page that is being converted that has not yet been analyzed is selected as a current list. All lists are analyzed in this way, whether or not they are contained inside of other lists. For example, lists may be considered in the order in which their start tags are encountered in the sequence of tokens.

In step S4322, all tokens within the current list are marked as editable. Operation then continues to step S4323, where a determination is made whether there are any unanalyzed lists remaining in the web page that is being converted. If so, operation returns to step S4321. Otherwise, operation continues to step S4324, where operation of the method returns to step S4380.

Figure 15:
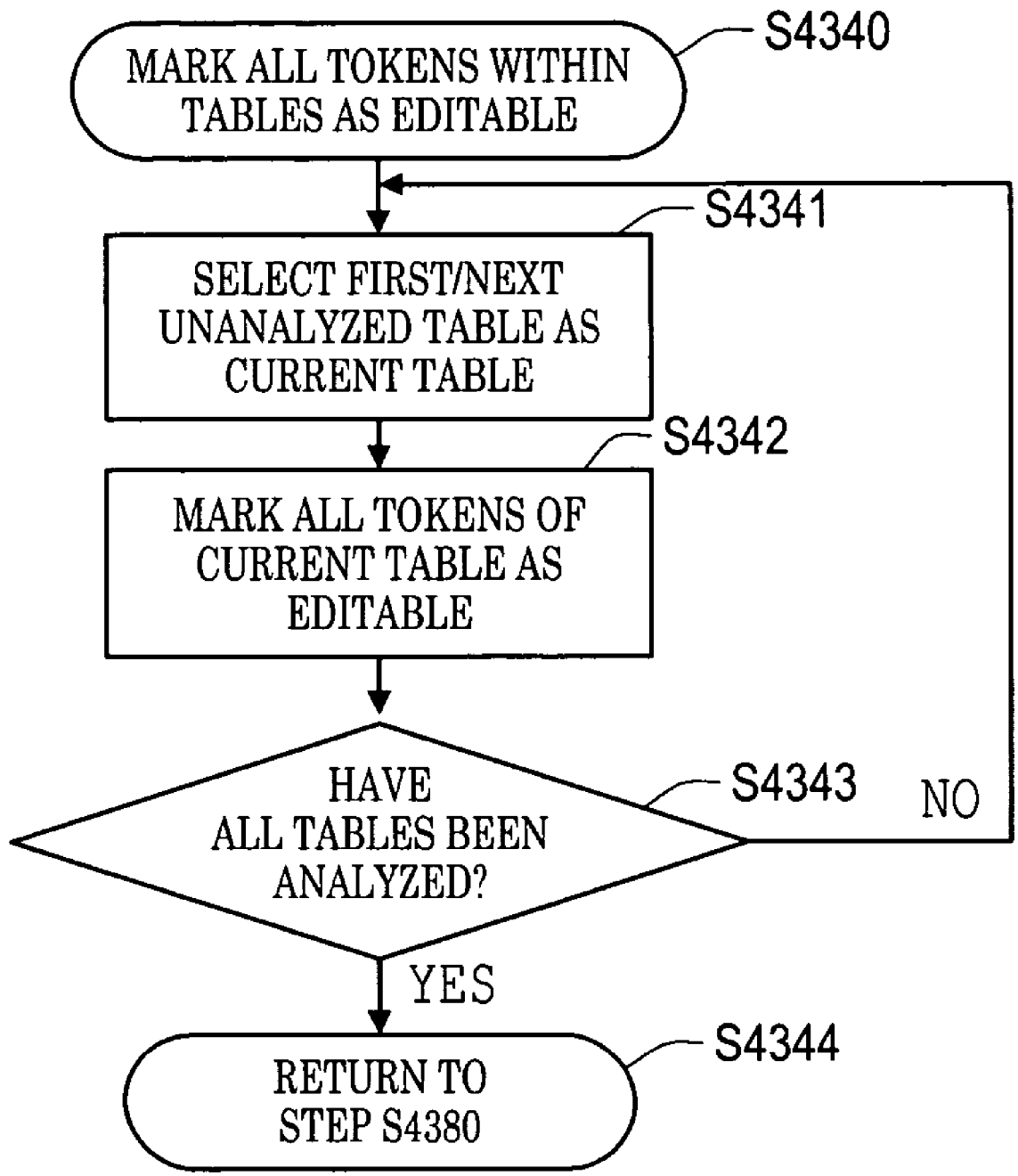
FIG. 15 is a flowchart outlining in greater detail one exemplary embodiment of the method for marking all tokens within tables of FIG. 13 according to this invention.

FIG. 15 is a flowchart outlining in greater detail one exemplary embodiment of the method of FIG. 13 for marking all tokens within tables as editable in accordance with this invention. As shown in FIG. 15, operation of the method begins in step S4340, and continues to step S4341, where a first or next table in the web page that is being converted that has not yet been analyzed is selected as a current table. All tables are selected in turn regardless of nesting level. For example, tables may be selected in the order in which their start tags appear in the token sequence. Then, in step S4342, each token of the current HTML table is marked as editable. Operation then continues to step S4343.

In step S4343, a determination is made whether there are any unanalyzed tables remaining in the web page that is being converted. If not, operation returns to step S4341. Otherwise, operation continues to step S4344, where operation of the method returns to step S4380.

Figure 16:
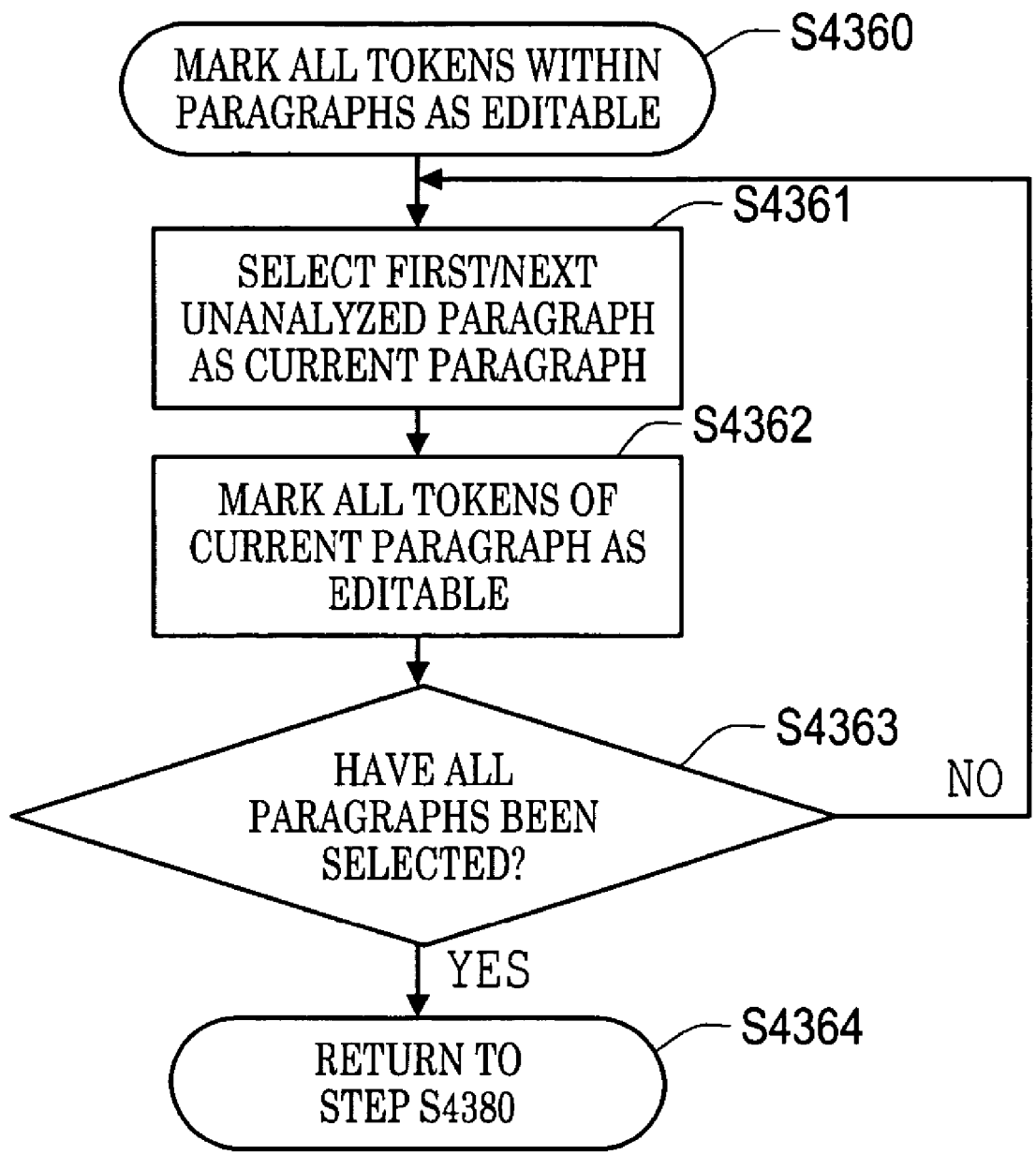
FIG. 16 is a flowchart outlining in greater detail one exemplary embodiment of the method for marking all tokens within paragraphs of FIG. 13 according to this invention.

FIG. 16 is a flowchart outlining in greater detail one exemplary embodiment of the method of FIG. 13 for marking all tokens within paragraphs as editable in accordance with this invention. As shown in FIG. 16, operation of the method begins in step S4360 and continues to step S4361, where a first or next paragraph is selected as the current paragraph. Then, in step S4362, all tokens of the current paragraph are marked as editable. Next, in step S4363, a determination is made whether all of the paragraphs have been selected. If not, operation returns to step S4361. Otherwise, operation continues to step S4364, where operation of the method returns to step S4380.

Figure 17:
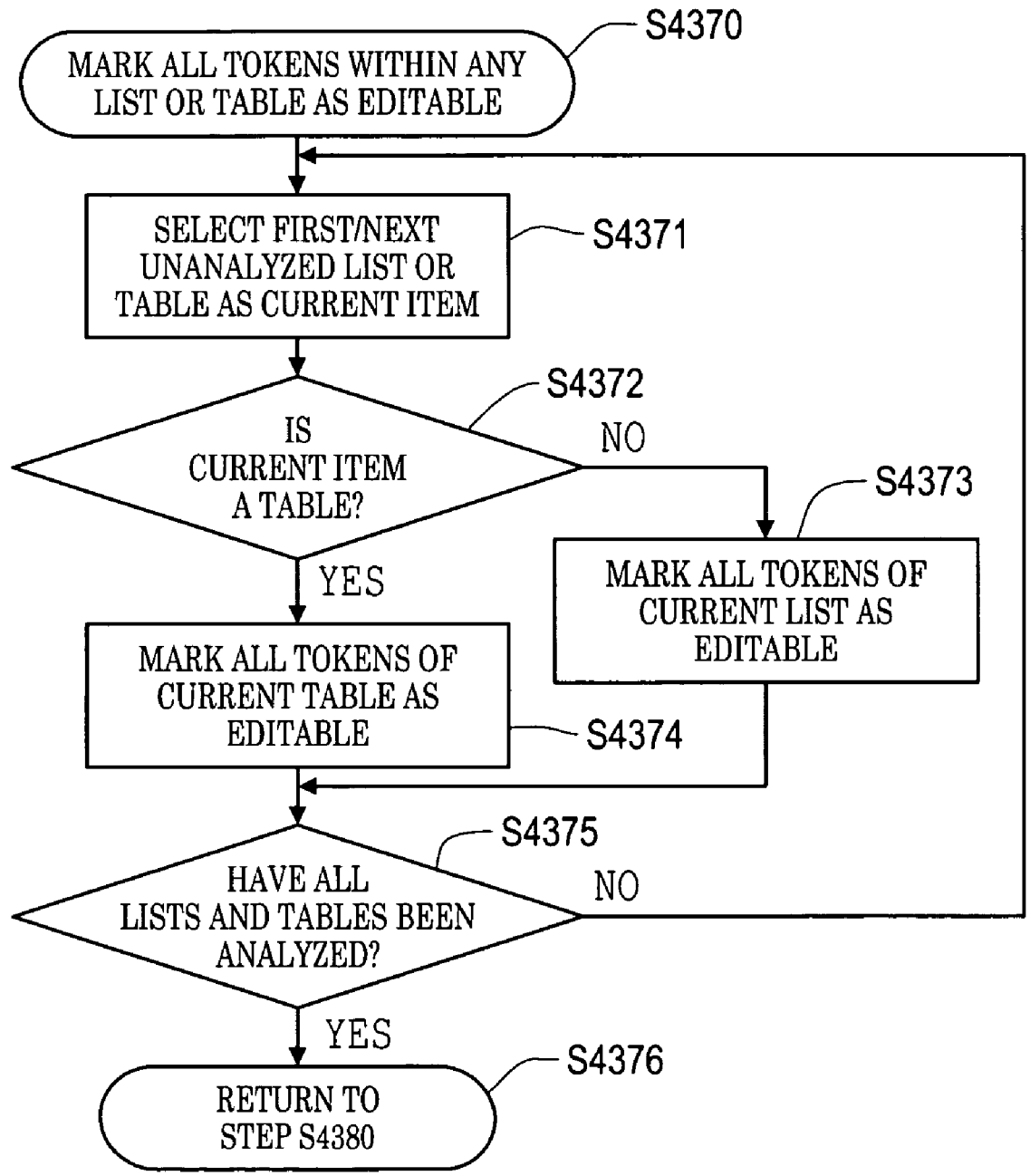
FIG. 17 is a flowchart outlining in greater detail one exemplary embodiment of the method for marking all tokens within any list or table of FIG. 13 according to this invention.

FIG. 17 is a flowchart outlining in greater detail one exemplary embodiment of the method of FIG. 13 for marking all tokens within any list or table as editable in accordance with this invention. As shown in FIG. 17, operation of the method begins in step S4370, and continues to step S4371, where a first or next list or table in the web page that is being converted that has not yet been analyzed is selected as a current item. All lists and tables are selected in turn, regardless of nesting level.

For example, they may be selected in the order in which their start tags appear in the token sequence. Then, in step S4372, a determination is made whether the current item is a table. If not, operation continues to step S4373. Otherwise, operation jumps to step S4374.

In step S4373, all tokens of the current list are marked as editable. Operation then jumps to step S4375. In contrast, in step S4374, all tokens of the current table are marked as editable. Operation then continues to step S4375, where a determination is made whether there are any unanalyzed lists or tables remaining in the web page that is being converted. If so, operation returns to step S4371. Otherwise, operation jumps to step S4376, where operation of the method returns to step S4380.

Determining the role of each token requires noting where in the character sequence each editable item of the output page will begin and end, and which elements will or will not be part of the editable items. This decision is based on several factors, which can include one or more of:
1. The value chosen by the user in the "What to convert" menu.
2. Whether a given token is part of a paragraph, a list, a table, or some combination of these.
3. Whether a given list has only one list item or multiple items.
4. Whether a given table has only one row or multiple rows.
5. Whether a given list or table is contained in another table.
6. Whether a given table contains other tables or lists.
7. Whether a given token is nested inside of a pre-existing FORM tag.

Figure 18:
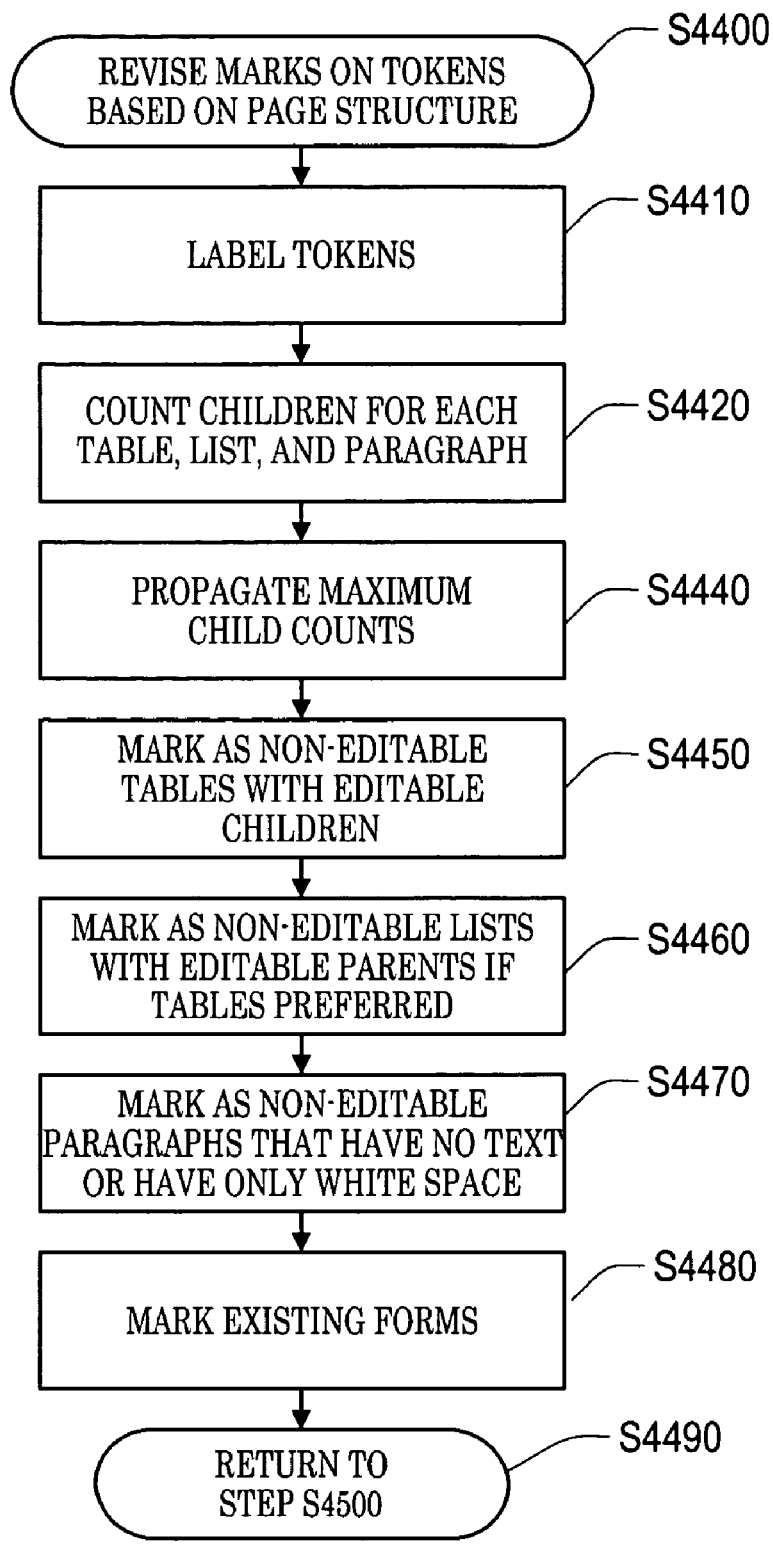
FIG. 18 is a flowchart outlining in greater detail one exemplary embodiment of the method for revising marks on tokens of FIG. 10 according to this invention.

FIG. 18 is a flowchart outlining in greater detail one exemplary embodiment of the method for revising marks on tokens based on page structure of FIG. 10 in accordance with this invention. As shown in FIG. 18, operation of the method begins in step S4400, and continues to step S4410, where each token is initially labeled. Distinct labels are applied to each token depending on whether that token is a beginning, an ending, or an internal token of a table, a row, a column, a list, list item, a paragraph, or is none of these. This label is called the segmentation type of the token. In addition, in the case of <A> (anchor) and <IMG> (image) tokens, special labels are used for anchor-in-a-list-item tokens, image-in-a-list-item tokens, anchor-in-a-table-cell tokens, and so on, because these tokens, among others, can be turned directly into Sparrow Web editable fields in later steps. Operation then continues to step S4420.

In step S4420, child tokens are counted for each table, list, and paragraph in the web page that is being converted. Next, in step S4440, the maximum child count is propagated for all of the tables, lists, and paragraphs in the web page that is being converted. Then, in step S4450, tables with editable children or with only one row are marked as non-editable (removing any previous editable mark). Operation then continues to step S4460.

In step S4460, lists with editable parents are marked as non-editable (removing any previous editable mark) in the case that the convert tables and lists, preferring tables flag is set. Then, in step S4470, paragraphs that have no text or only have white space are marked as non-editable. Next, in step S4480, existing forms are marked. Operation then continues to step S4490, where operation of the method returns to step S4500.

Although tokens have been shown as being marked editable in FIG. 13 and then revised based on page structure in FIG. 18, it should be appreciated that tokens can be marked in various ways. For example, instead of marking tokens editable and then revising token marks as non-editable, only tokens that are to be editable can be marked editable. Thus, tokens that are to be non-editable are never marked.

Figure 19:
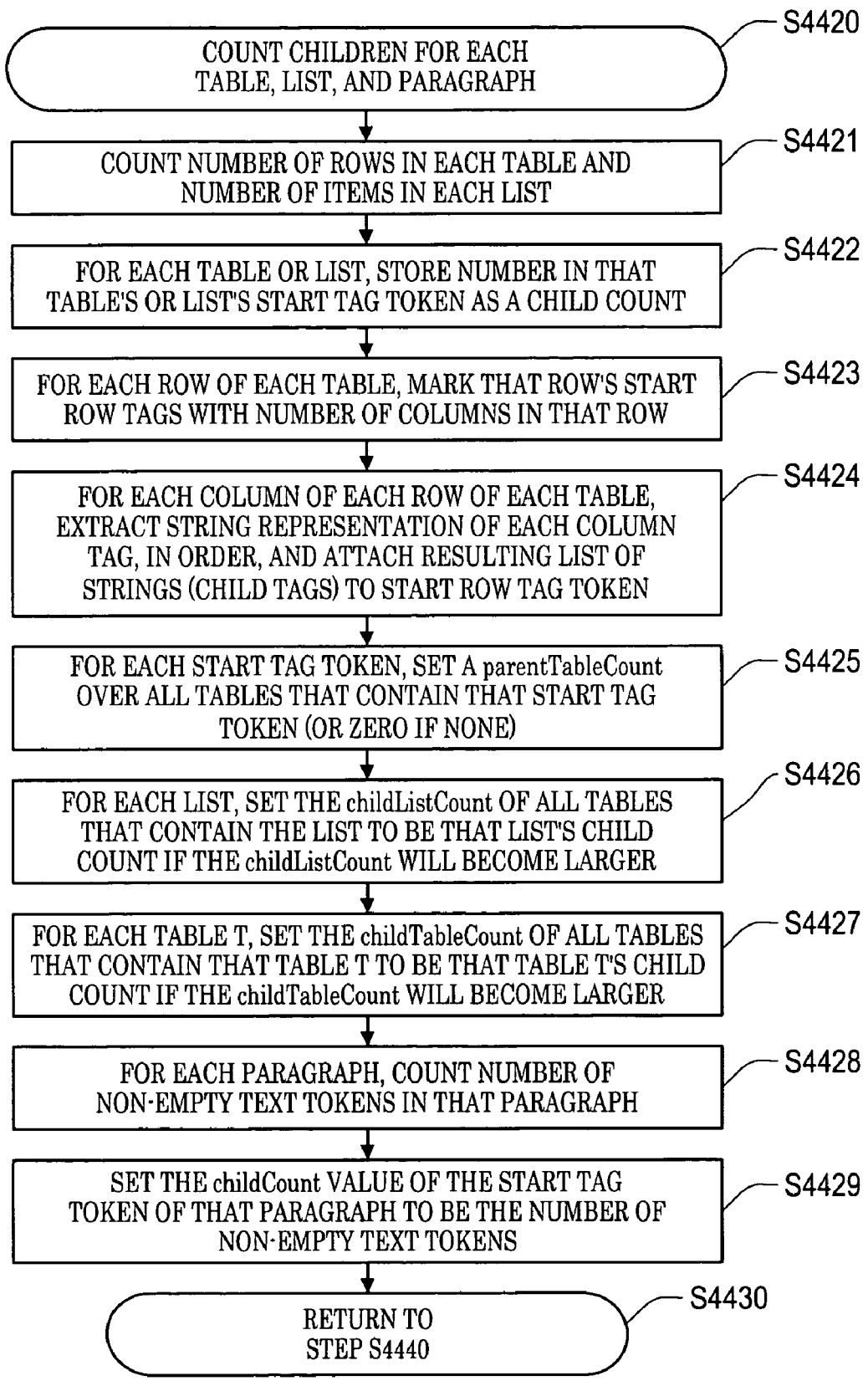
FIG. 19 is a flowchart outlining in greater detail one exemplary embodiment of the method for counting children of FIG. 18 according to this invention.

FIG. 19 is a flowchart outlining in greater detail one exemplary embodiment of the method for counting children of FIG. 18 in accordance with this invention. The childCount, parentTableCount, childTableCount, and childListCount information is used in subsequent steps to determine exactly which tables or lists are to be converted, e.g., are to be "Sparrowized."

As shown in FIG. 19, operation of the method begins in step S4420 and continues to step S4421, where the number of rows in each table and the number of items in each list are counted. Then, in step S4422, for each table, the number of counted rows is stored in that table's start tag token as the table "childCount". Likewise, for each list the number of counted items is stored in that list's start tag token as the list's "childCount". Then, in step S4423, for each table row of each table, the table row or TR start tags are marked with the number of columns or TD tags that each table row contains. Next, in step S4424, in addition to counting children, for each column of each row of each table, the string representation of each column tag TD is taken in order, and the resulting list of strings, called the "childTags", are attached to the TR token of that row. Operation then continues to step S4425.

In step S4425, all tokens on the page are considered in order. For each token, all tables on the page that contain that token within the start and end tags of the table are considered, a parentTableCount of the current token is set to be the maximum value of childCount over all tables considered. In this operation, it can be determined whether any given table or list is nested inside of a multi-row table. Operation then continues to step S4426.

In step S4426, each list is considered in turn. As the list is considered, that list is called the current list. Then, for each table containing the current list, that table's childListCount value is set as the childCount value of the current list if doing so will make childListCount value larger. Once all lists have been considered, for each table, whether that table contains any multi-item lists will be known. Operation then continues to step S4427.

In step S4427, each table is considered in turn. As a table is considered, that table is called the current table. Then, for each table containing the current table, that table's childTableCount value is set as the childCount value of the current table if doing so will make childTableCount value larger. Once all tables have been considered, for each table, whether that table contains any multi-row tables will be known. Operation then continues to step S4428.

In step S4428, for each paragraph, the number of non-empty text tokens in that paragraph is counted. Then, in step S4429, for each paragraph, the childCount value of the start tag token of that paragraph is set to be the number of non-empty text tokens that is contained in that paragraph. Operation then continues to step S4430, where operation of the method returns to the step S4440.

Figure 20:
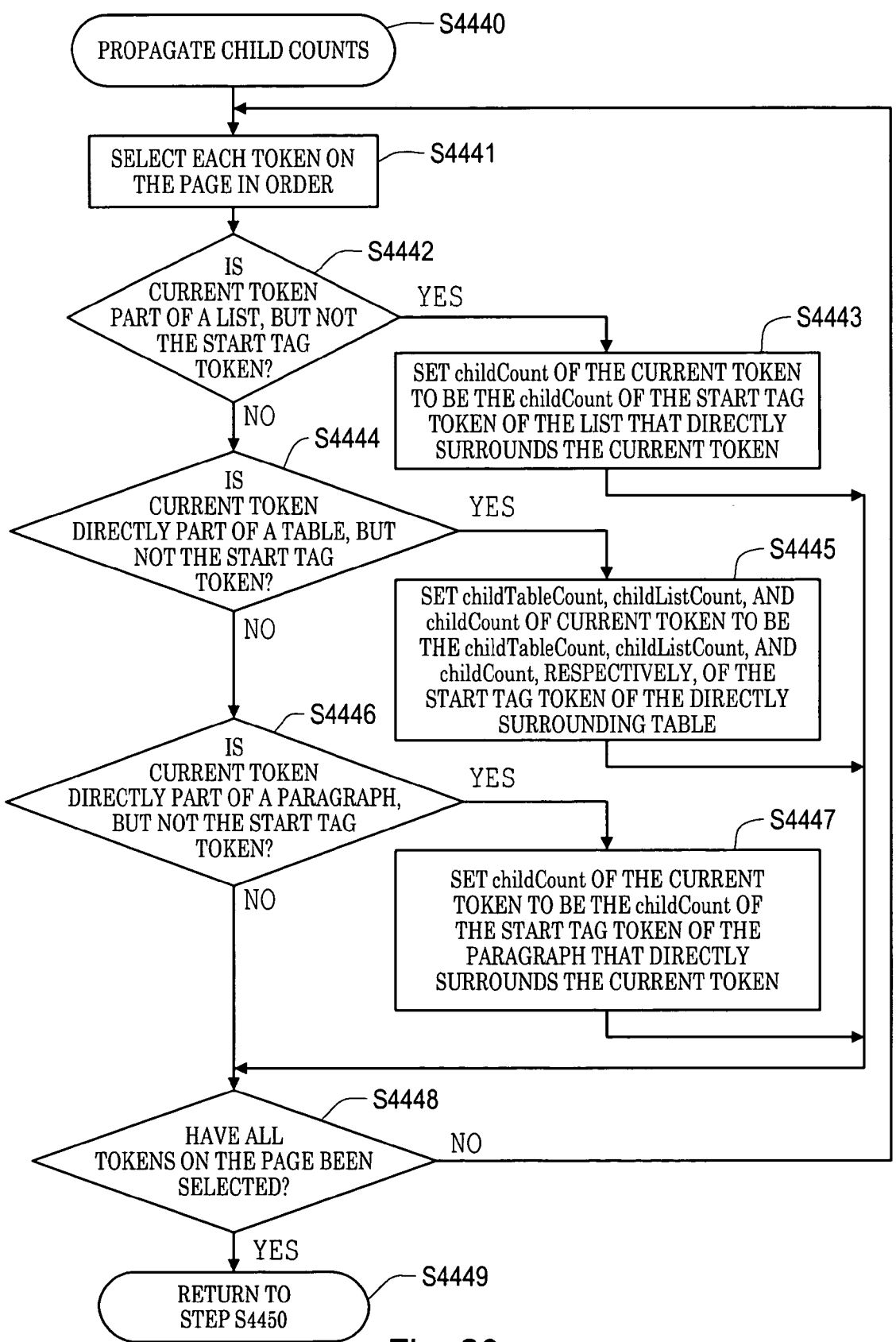
FIG. 20 is a flowchart outlining in greater detail one exemplary embodiment of the method for propagating child counts of FIG. 18 according to this invention.

FIG. 20 is a flowchart outlining in greater detail one exemplary embodiment of the method for propagating child counts of FIG. 18 in accordance with this invention. As shown in FIG. 20, operation of the method begins in step S4440, and continues to step S4441, where, each token on the page is considered in order. Then, in step S4442, a determination is made whether the current token is both directly part of a list such as, for example, a start list tag, end list tag, start item tag, end item tag, or a tag internal to an item, and not the start list tag. If so, operation continues to S4443. Otherwise, operation continues to S4444.

In step S4443, the childCount of the current token is set to the value of childCount that is presently available on the start tag token of the list that most tightly contains the current token. This operation ensures that all tokens of a list are aware of the number of items in the list in which those tokens play a part. This information is used later to decide if these tokens should be included in an editable item. Operation then jumps to step S4448.

In step S4444, a determination is made whether the current token is both directly part of a table and not the start tag of a table. If so, operation proceeds to S4445. Otherwise, operation proceeds to S4446. In step S4445, the childTableCount, childListCount, and childCount of the current token are set to the childTableCount, childListCount, and childCount, respectively, of the start tag token that begins the table that directly contains this token. This operation ensures that all tokens of a table are aware of the number of rows in the table of which those tokens play a part, whether or not that table contains any multi-row tables, and whether or not that table contains any multi-item lists. As a result, this information will be easy to find for use in subsequent steps. Operation then jumps to step S4448.

In step S4446, a determination is made whether the current token is directly a part of a paragraph but not the start tag token. If so, operation continues to step S4447. Otherwise, operation jumps to step S4448. In step S4447, the childCount of the current token is set to the childCount of the start tag token of the paragraph that directly contains the current token. Operation then continues to step S4448, where a determination is made whether all tokens on the page have now been selected. If so, operation continues to step S4449, where operation of the method returns to step S4450. Otherwise, operation returns to step S4441, where the next token is selected.

Figure 21:
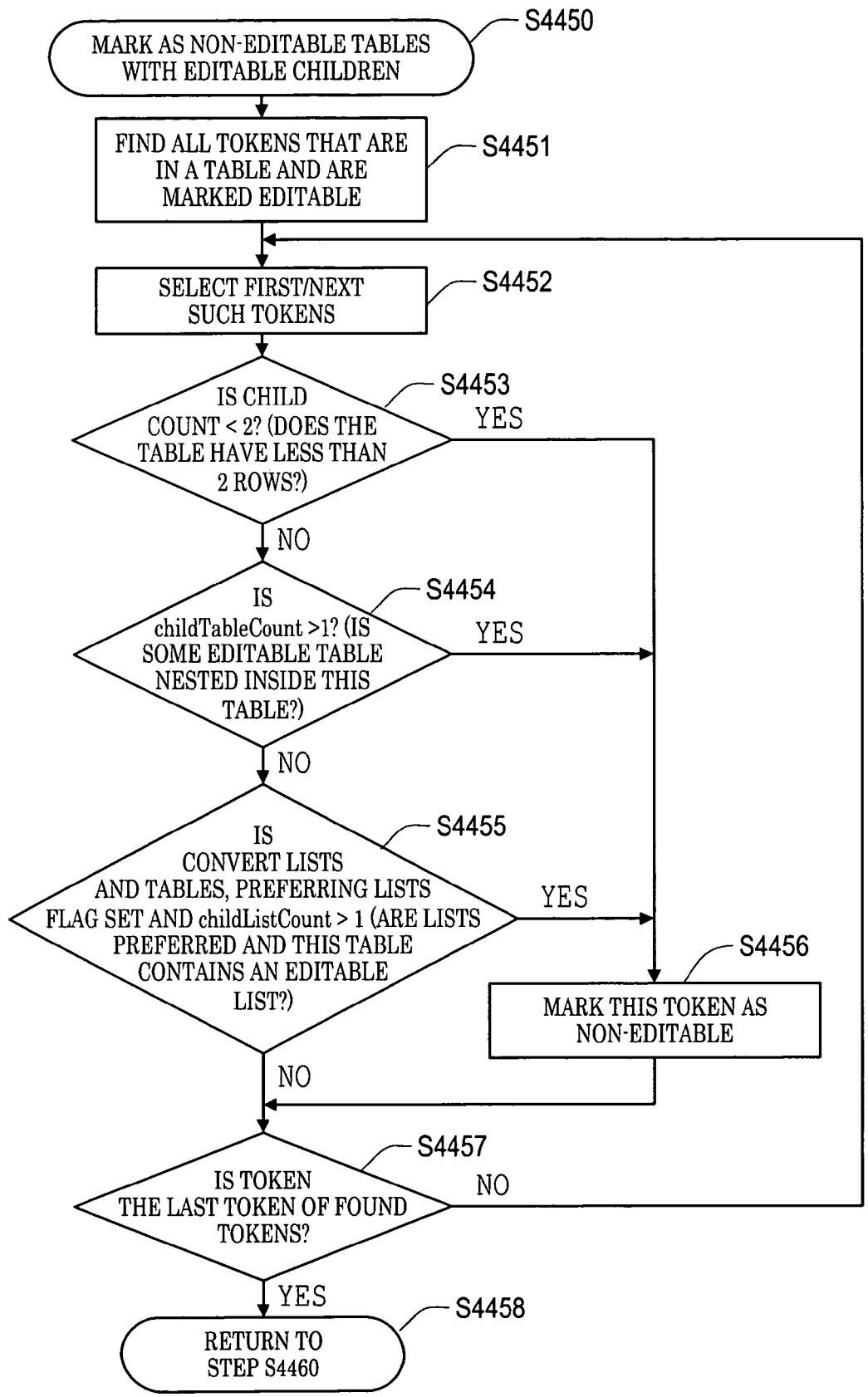
FIG. 21 is a flowchart outlining in greater detail one exemplary embodiment of the method for marking as non-editable tables with editable children of FIG. 18 according to this invention.

FIG. 21 is a flowchart outlining in greater detail one exemplary embodiment of the method for marking as non-editable tables with editable children of FIG. 18 in accordance with this invention. As shown in FIG. 21, operation of the method begins in step S4450, and continues to step S4451, where all tokens that are in a table and marked as editable are found. Then, in step S4452, a first or next such token is selected. Next, in step S4453, a determination is made whether the child count is less than 2, i.e., does this table have less than 2 rows? If so, operation jumps directly to step S4456. Otherwise, operation continues to step S4454.

In step S4454, a determination is made, for each table, whether the childTableCount is greater than 1, i.e., whether some editable table is nested inside the current table. If so, operation again jumps to step S4456. Otherwise, operation continues to step S4455.

In step S4455, a determination is made, for the current token, whether its childListCount is greater than 1 and whether the convert lists and tables, preferring lists flag is set, i.e., whether both lists are preferred over tables to be made editable and also an editable list is nested inside the table that includes the current token. If so, operation continues to step S4456. Otherwise, operation jumps to step S4457.

In step S4456, the current token is marked as non-editable, because it is part of a table that should not be made editable. Next, in step S4457, a determination is made whether the token is the last token. If not, operation returns to step S4452. Otherwise, operation continues to step S4458, where operation of the method return to step S4460.

In various exemplary embodiments, as described above with respect to FIGS. 13, 21 and 24, when tables are nested, only the most deeply-nested table that has more than one row is converted. It should be appreciated that it is not impossible to convert all nested tables. Rather, in these exemplary embodiments, this limitation is made to alleviate the complexities involved for the user in editing a page that has nested editable items. Accordingly, various other exemplary embodiments of these disclosed methods can be used to convert any two or more of these nested tables.

Figure 22:
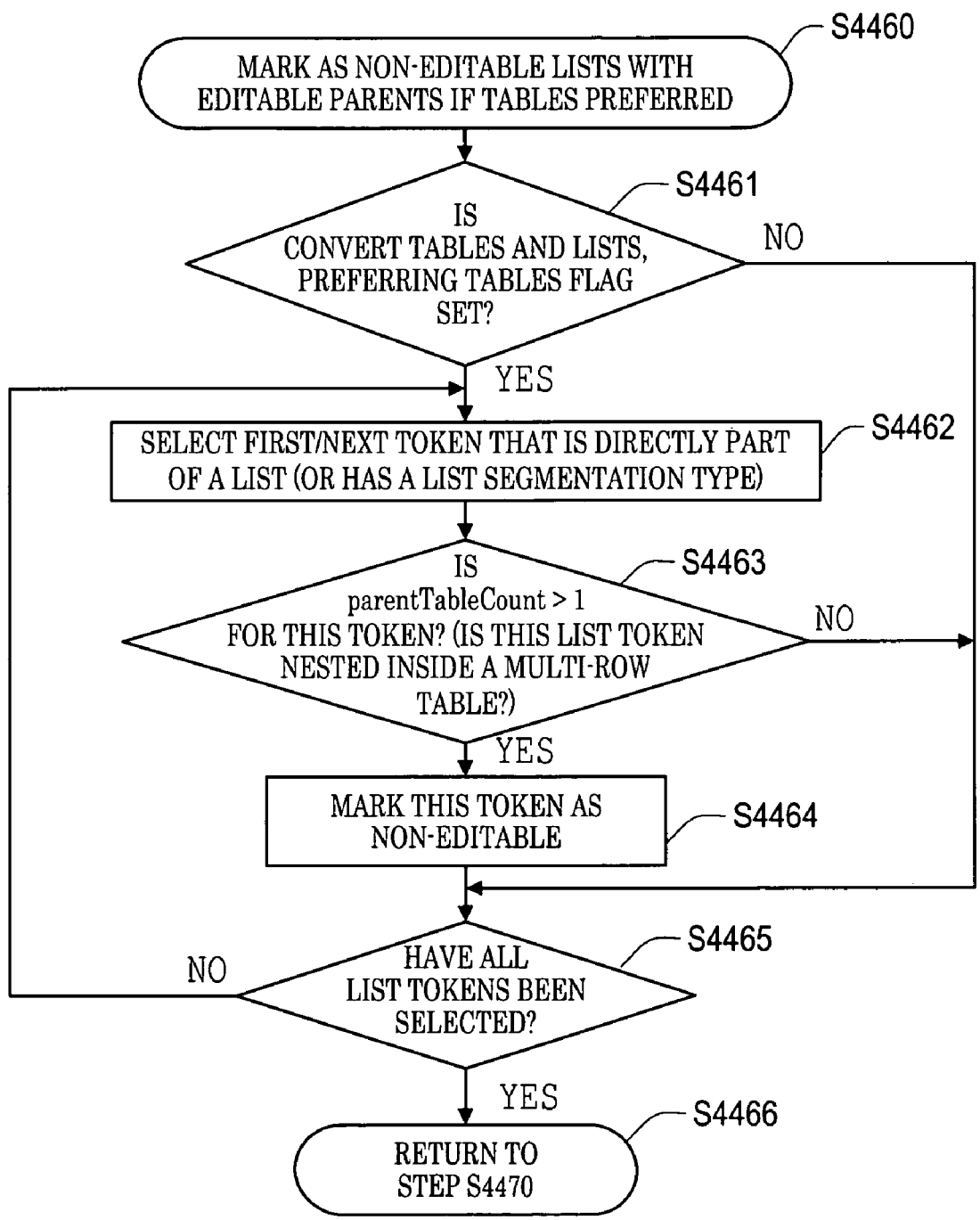
FIG. 22 is a flowchart outlining in greater detail one exemplary embodiment of the method for marking as non-editable lists with editable parents of FIG. 18 according to this invention.

FIG. 22 is a flowchart outlining in greater detail one exemplary embodiment of the method for suppressing lists with editable parents of FIG. 18 in accordance with this invention. As shown in FIG. 22, operation of the method begins in step S4460, and continues to step S4461, where a determination is made whether the convert tables and lists, preferring tables flag is set. If so, operation continues to step S4462. Otherwise, operation jumps to step S4466.

In step S4462, a first or next list token is selected as a current list token. Then, in step S4463, for each list token, a determination is made whether the parentTableCount for the current list token is greater than 1, i.e., whether the current list token is nested inside a table. If so, operation continues to step S4464. Otherwise, operation jumps to step S4465.

In step S4464, the current list token is marked as non-editable, because it is part of a list that is nested in an editable table and tables are preferred over lists for becoming editable. Operation then continues to step S4465, where a determination is made whether all list tokens have been selected. If not, operation returns to step S4462. Otherwise, operation continues to step S4466, where operation of the method returns to step S4470.

It should be appreciated that it is not impossible to convert both lists and tables. Rather, in various exemplary embodiments, this limitation is used to alleviate the complexities involved for the user in the editing process if editable items are allowed to contain yet other editable items. Furthermore, although only tables with more than one row (childCount>1) are made editable, it should be appreciated that it is not impossible to convert tables with only one row. Similarly, in various exemplary embodiments, this limitation is used to alleviate the complexities involved for the user in the editing process (e.g., if the original page contains many single-row tables used for formatting effects, the user may be presented with an excessive number of editable table rows). Accordingly, various other exemplary embodiments of these disclosed methods can be used to convert all lists and tables, whether nested or not, and tables with any number of rows.

It should be appreciated that Sparrow Web items generally include buttons that cause Sparrow Web to be called when activated. The buttons call Sparrow Web because a URL of the Sparrow Web server is mentioned in a FORM tag that surrounds all of the Sparrow Web buttons on a page. However, a problem can occur if the Web page to be converted already includes one or more regions in FORM Tags.

In various exemplary embodiments of the systems and methods of this invention, the creation of editable items inside of any existing FORM tags is explicitly suppressed. This is accomplished by finding any existing FORM or /FORM tags using the tag path in each intermediate structure to identify tokens that fall within such FORM tags. All such tokens are marked as non-editable so that they will not be placed into editable items.

Figure 23:
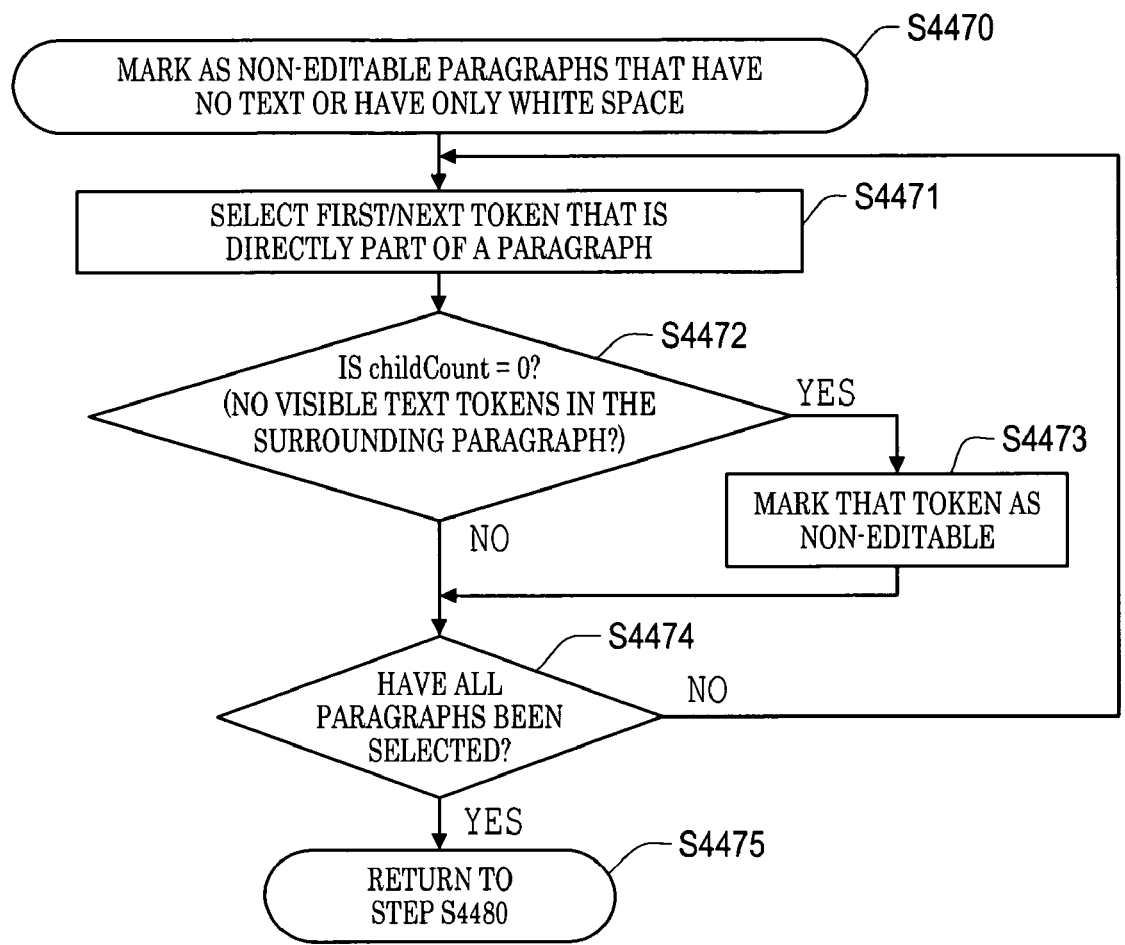
FIG. 23 is a flowchart outlining in greater detail one exemplary embodiment of the method for marking as non-editable paragraphs that have no text or only white space of FIG. 18 in accordance with this invention.

FIG. 23 is a flowchart outlining in greater detail one exemplary embodiment of the method for marking as non-editable paragraphs that have no text or only white space of FIG. 18 in accordance with this invention. As shown in FIG. 23, operation of the method begins in step S4470, and continues to step S4471, where a first or next token that is part of a paragraph is selected. Then, in step S4472, a determination is made whether the childCount of that paragraph is equal to 0. If so, operation continues to step S4473. Otherwise, operation jumps to step S4474.

In step S4473, that token is marked as non-editable. Operation then continues to step S4474, where a determination is made whether all paragraphs have been selected. If not, operation jumps back to step S4471. Otherwise, operation continues to step S4475, where operation of the method returns to step S4480.

Figure 24:
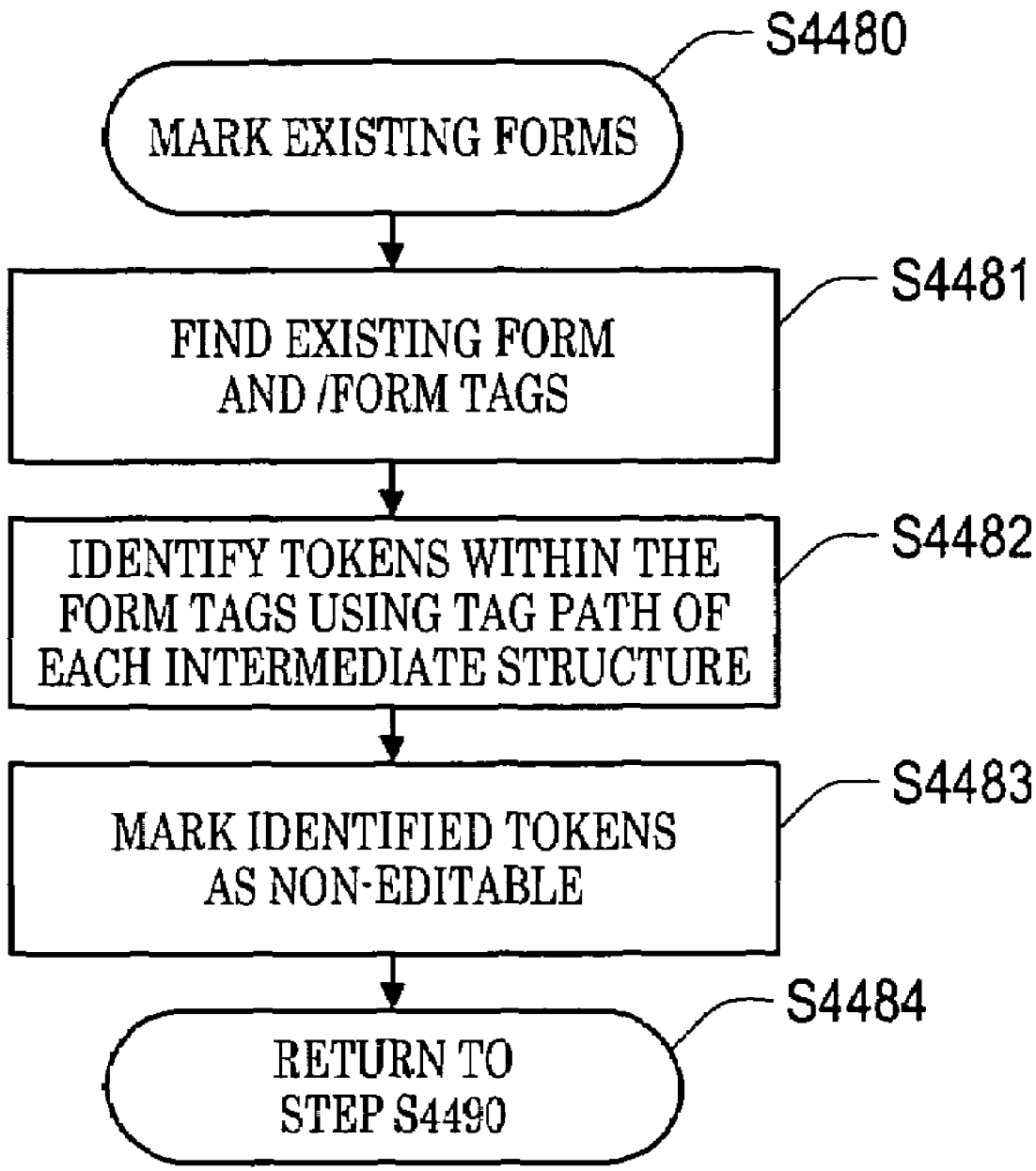
FIG. 24 is a flowchart outlining in greater detail one exemplary embodiment of the method for marking existing forms of FIG. 18 according to this invention.

FIG. 24 is a flowchart outlining in greater detail one exemplary embodiment of the method for marking existing forms of FIG. 18 in accordance with this invention. As shown in FIG. 24, operation of the method begins in step S4470, and continues to step S4471, where existing FORM and /FORM tags are found. Then, in step S4472, for each FORM tag, any tokens within that FORM tag are identified using the tag path in each intermediate structure. Next, in step S4473, the tokens are marked as non-editable. Operation then continues to step, step S4474, where operation of the method returns to step S4480.

It should be appreciated that it is not impossible to convert elements within existing FORM tags to be editable. Rather, in various exemplary embodiments, this procedure is used in order to preserve the operation of any buttons, menus, or other interactors that are present within the existing FORM tags.

In various exemplary embodiments of Sparrow Web, every editable item must be associated with a single named template that describes how many editable fields the item will have, what interactors will be available to edit each field, how each field will be formatted for display, and what additional web page code elements should be added between all of the fields to produce the layout of a complete item. In various exemplary embodiments, all of the templates in use in a page are included in the HEAD section at the top of the page.

In determining the role for the tokens, the beginning and the ending of each editable item in the output page was determined. However, which parts of the item will be editable, which will be fixed parts of the item template, and how many editable parts an item will have, has not been determined. For those parts that will be editable by users, which type of Sparrow Web field will hold them, and hence which interactors will appear when those parts are opened for editing, has not been determined.

Figure 25:
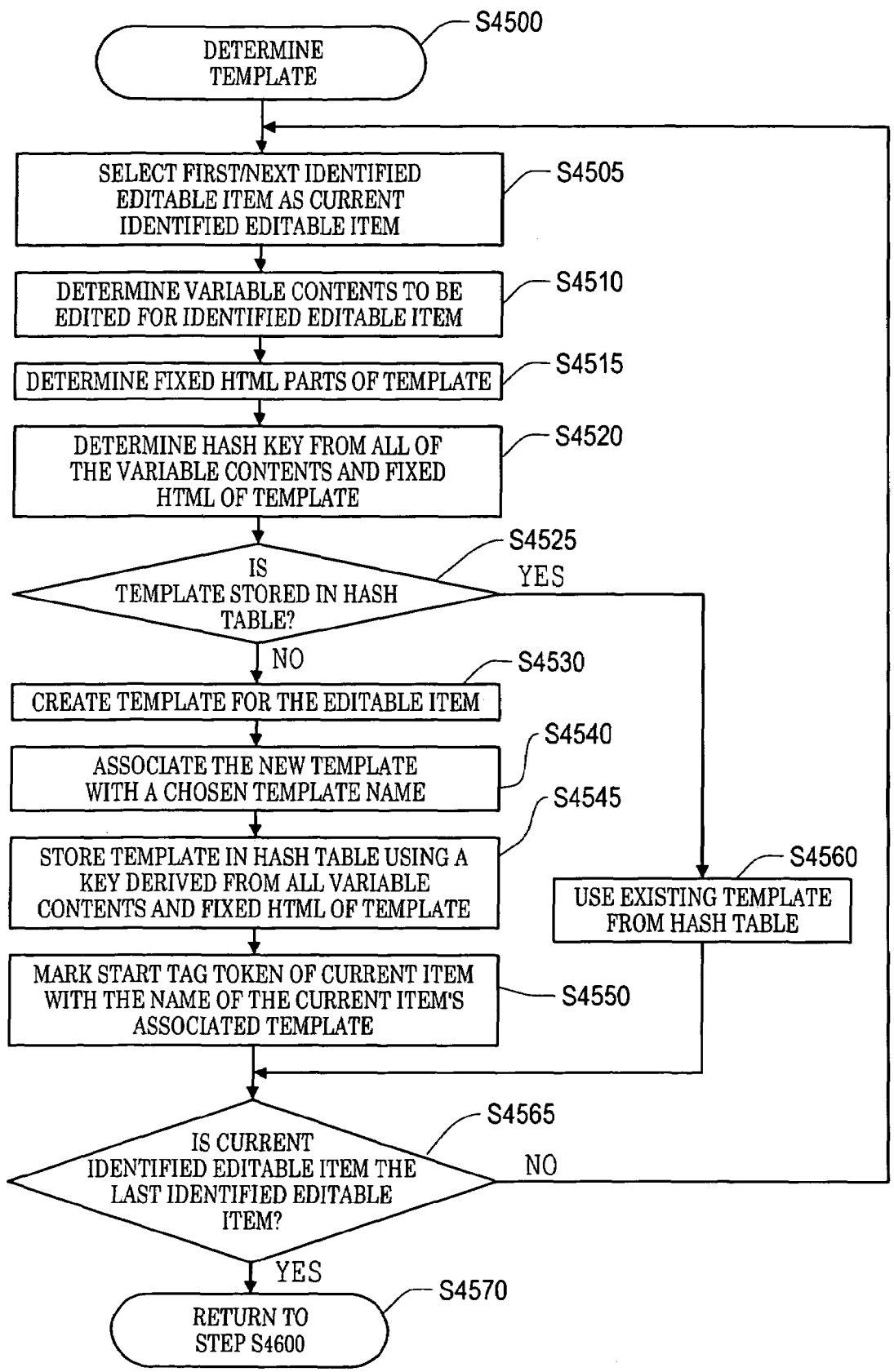
FIG. 25 is a flowchart outlining in greater detail one exemplary embodiment of the method for determining templates of FIG. 10 according to this invention.

FIG. 25 is a flowchart outlining in greater detail one exemplary embodiment of the method for determining templates of FIG. 10 in accordance with this invention. As shown in FIG. 25, operation of the method begins in step S4500, and continues to step S4505, where a first or next identified editable item is selected as a current identified editable item. Next, in step S4510, the variable contents to be edited are determined for each editable item. Then, in step S4515, the fixed HTML parts of the template are determined. Operation then continues to step S4520.

In step S4520, the hash key from all of the variable contents and fixed HTML of the template are completed. Next, in step S4525, for each template, a determination is made whether that template is stored in a hash table (or any other unique mapping from data values to templates). If so, operation jumps to step S4560. Otherwise, operation continues to step S4530.

In step S4560, the existing template from the hash table is used. Operation then continues to step S4565. In contrast, in step S4530, a new template is created based on the determined fixed HTML parts, variable contents, and the value of the place editing icon flags. Operation then continues to step S4540.

In step S4540, the new template is associated with a chosen template name. Then, in step S4545, the template is stored in a hash table using a hash key that is determined from all of the variable contents and fixed html of the template. For example, the hash key or unique identifier for a template to be used to format a table row is a text string derived from the text of the start row tag, the number of columns of the table, the editing icon position (before or after), and the child tags computed in FIG. 19. It should be appreciated that each template is given a unique name that is also stored in the hash table. Operation then continues to step S4550.

In step S4550 the current item is marked with the unique name of the template (whether that template was newly created or existed previously). Then, in step S4565, a determination is made whether the current identified editable item is the last identified editable item. If not, operation returns to step S4505. Otherwise, operation continues to step S4570, where operation of the method return to step S4600.

Figure 26:
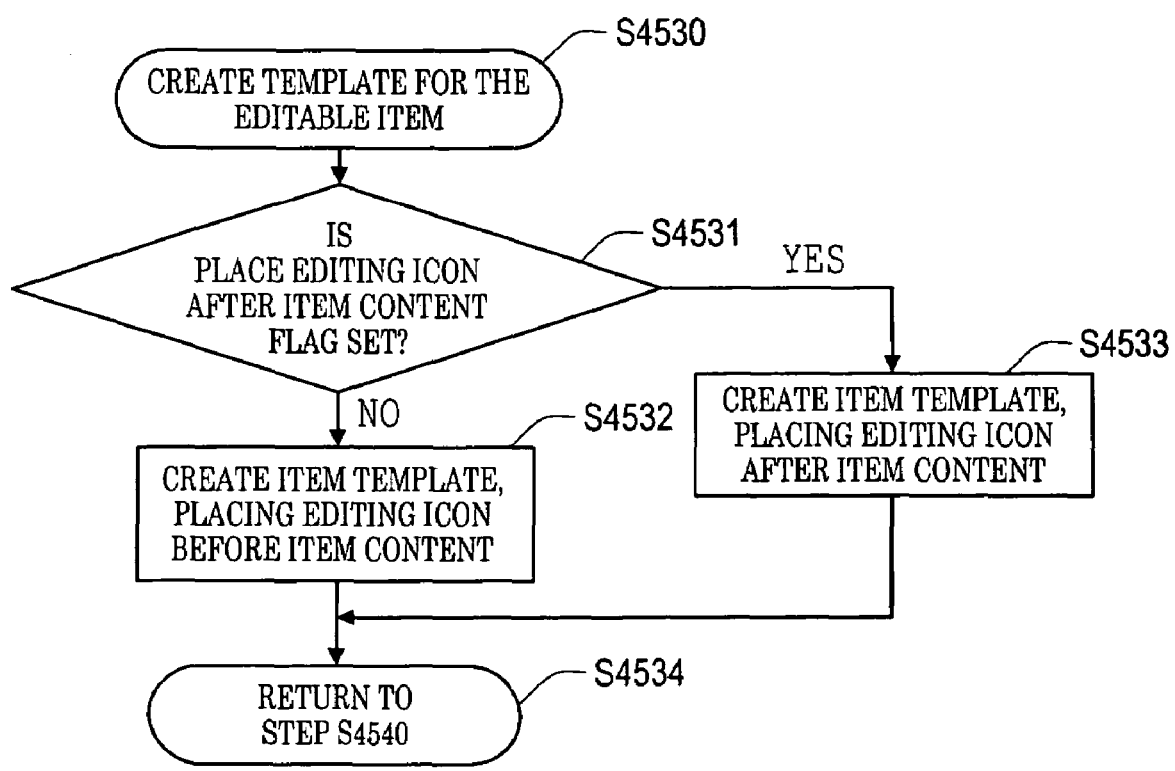
FIG. 26 is a flowchart outlining in greater detail one exemplary embodiment of the method for creating a template for the editable item of FIG. 25 according to this invention.

FIG. 26 is a flowchart outlining in greater detail one exemplary embodiment of the method for creating templates for the editable items of FIG. 24 in accordance with this invention. As shown in FIG. 26, operation of the method begins in step S4530, where the new template is created for an editable item based on the determined fixed HTML parts, variable contents, and the value of the place editing icon flags. Then, in step S4531, a determination is made whether the after item content flag is set. If so, operation jumps to step S4533. Otherwise, operation continues to step S4532.

In step S4533, an item template is created that places editing icons after the item contents of each editable item, or in the case of tables, in a new right-most column. Operation then continues to step S4534. In contrast, in step S4532, an item template is created that places editing icons before the item contents of each editable item, or in the case of tables, in a new left-most column. Operation then jumps to step S4534, where operation of the method returns to step S4540.

Figure 27:
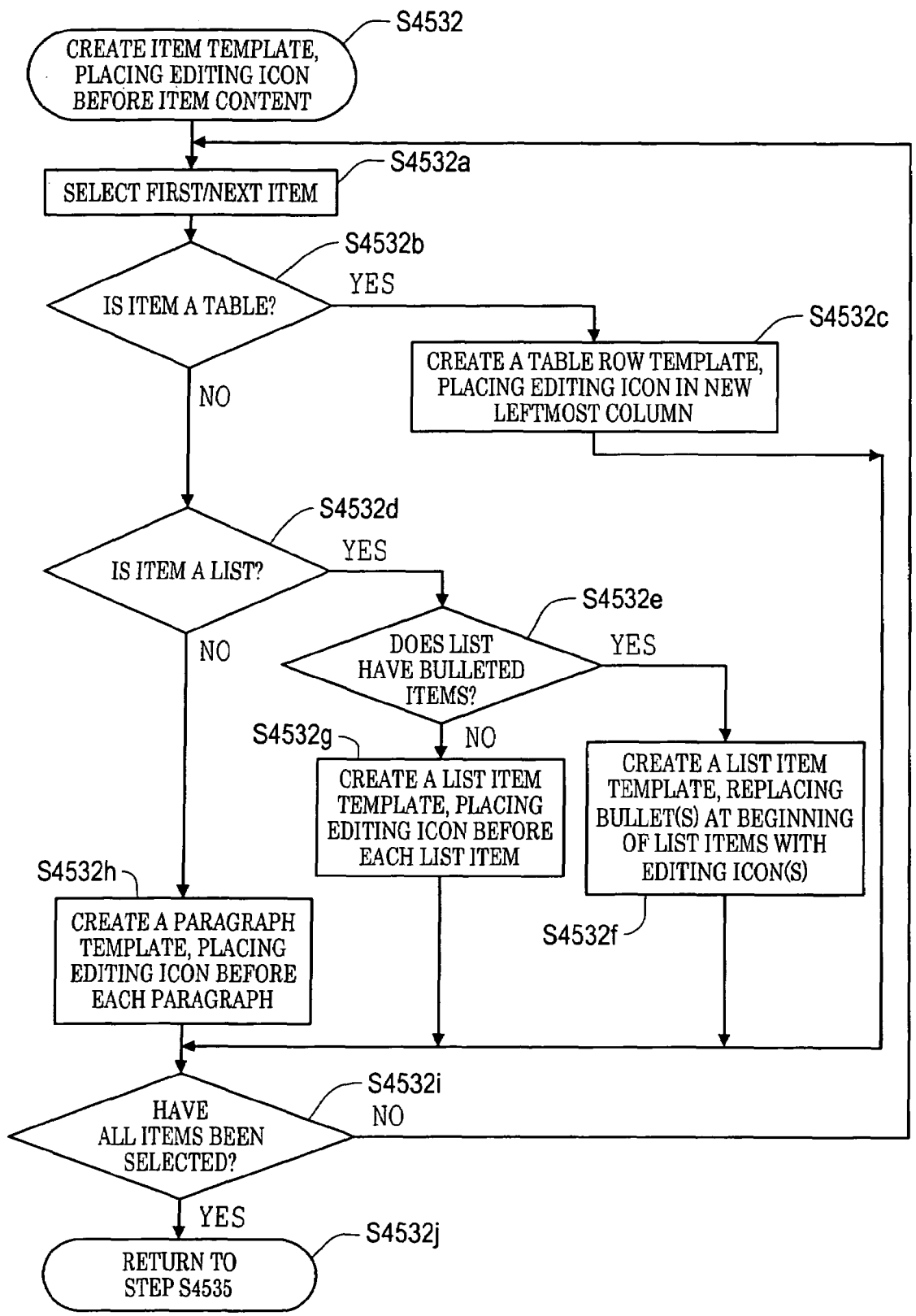
FIG. 27 is a flowchart outlining in greater detail one exemplary embodiment of the method of FIG. 26 for placing the editing icon before the item content according to this invention.

FIG. 27 is a flowchart outlining in greater detail one exemplary embodiment of the method for placing the editing icons before the item contents of FIG. 26 in accordance with this invention. As shown in FIG. 27, operation of the method begins in step S4532, and continues to step S4532a, where a first or next item is selected as the current item. Then, in step S4532b, a determination is made whether the current item is a table. If so, operation continues to step S4532c. Otherwise, operation jumps to step S4532d.

In step S4532c, a template is created to place an editing icon in the left-most column of the table. Operation then jumps to step S4532i. In contrast, in step S4532d, a determination is made whether that item is a list. If so, operation continues to step S4532e. Otherwise, operation jumps to step S4532h.

In step S4532e, a determination is made whether the current list's items are bulleted. If so, operation continues to step S4532f. Otherwise, operation jumps to step S4532g. In step S4532f, a list item template is created to replace the bullets at the beginning of each list item with editing icons. Operation then jumps to step S4532i. In contrast, in step S4532g, a list item template is created to place editing icons before each list item, or in the case of tables, in a new left-most column. Operation then jumps to step S4532i.

In step S4532h, a paragraph template is created to place editing icons before each paragraph. Operation then continues to step S4532i, where a determination is made whether all items have been selected. If not, operation returns to step S4532a. Otherwise, operation continues to step S4532j, where operation of the method returns to step S4534.

More than one sensible template can be produced for any given item. For example, one template may give more power to contributors and less power to the page author and another template may do the reverse. Some templates may result in pages that require some knowledge about the web page code language on the part of the user, while others do not. It should be appreciated that, in various exemplary embodiments of the systems and methods of this invention, a user interface may be provided so the user can make some of these choices regarding the templates.

Figure 28:
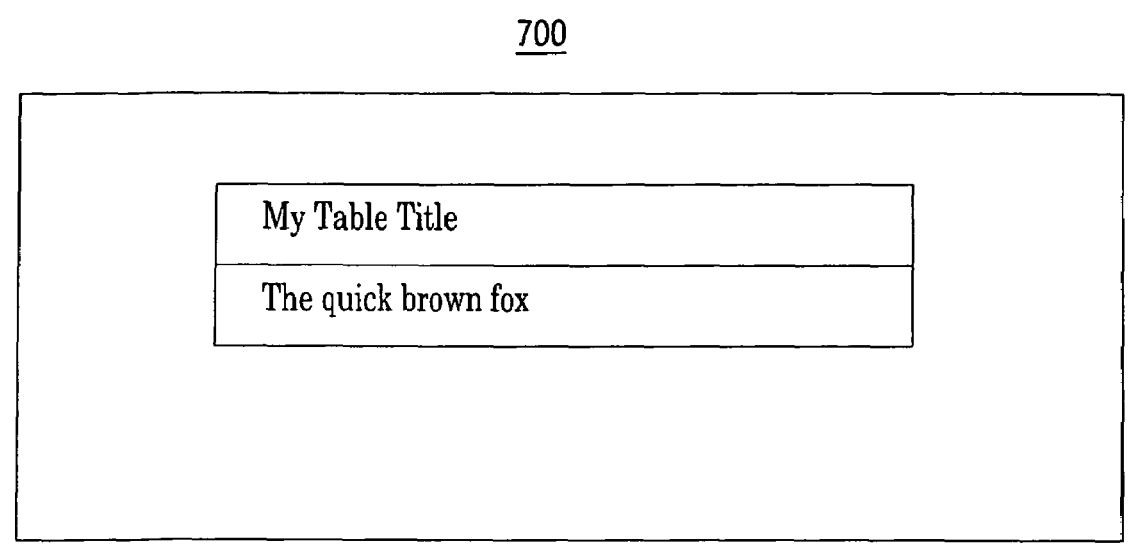

For example, consider the exemplary embodiment of a standard web page 700, shown in FIG. 28, used as an input or source document that includes a HTML table. The first HTML source code segment 710 in FIG. 29 shows one exemplary embodiment of an HTML source code segment usable to form the web page 700. The HTML table is created by the first part of the following exemplary source code segment 710 shown in FIG. 29:

```
<table width="95%">
<tr><td>My Table Title</td></tr>
<tr><td>The quick brown fox</td></tr>
</table>
```

If, for example, the user then selects "Tables Only" from the "What to convert" menu, the conversion steps outlined above will mark the two TR spans to be made into editable items. A single template will work for both table rows. The template might be given the chosen template name tableRow1 and might read:

```
<tr><td><input type="image" src="triangle.gif" name="Edit-0"></td>
<td><FIELD TYPE="TEXTAREA" NAME="cell"></td></tr>
``` meaning that the <tr>, <td>, <input>, </td>, and </tr> tags are a fixed part of the template.

Figure 30:
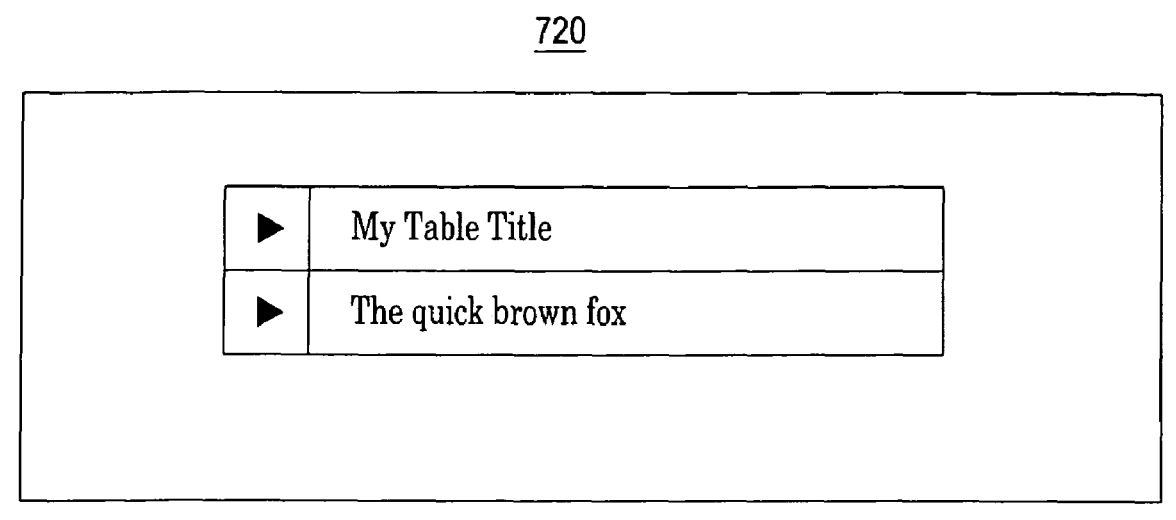

FIG. 30 illustrates an exemplary embodiment of a Sparrow Web type page 720 converted from the standard web page 700 shown in FIG. 28. The Sparrow Web page 720 is similar in appearance to standard web page 700, but now includes a button, in the shape of a little black triangle, that has been added at the beginning of each table row, in a separate new column. This button is also a fixed part of the template. The strings "My Table Title" and "The quick brown fox" are variable content that can be edited by the user. The use of a FIELD of type TEXTAREA here means that the user will have the use of a multi-line text editing area when modifying these fields. Furthermore, once this page is created, the page author can modify this template and, in doing so, change the data schema and/or layout of all of the rows of this table.

The table in the standard web page 700 shown in FIG. 28 can be modified by using the second source code segment 711 shown in FIG. 29:

```
<table width="95%">
<tr><td bgcolor="yellow">My Table Title</td></tr>
<tr><td>The quick brown fox</td></tr>
</table>
```

In this exemplary embodiment, similar in appearance to window 700 with the exception of a highlighted cell, one of the TD tags has an attribute that sets the background color within its table cell. The tableRow1 template above will no longer suffice to format both rows of the table, if it is desired to preserve all layout information. To handle this situation, a second template, tableRow2, can be created to represent a yellow-highlighted cell. The need for a second template is determined by looking at the "childTags" data structure, which includes information about the attributes of all of the relevant TD tags.

Thus, the tableRow2 template might look like:

```
<tr><td><input type="image" src="triangle.gif" name="Edit-0"></td>
<td bgcolor="yellow"><FIELD TYPE="TEXTAREA" NAME="cell"></td></tr>
```

Since there are now two templates to modify in order to modify the layout of all items in this table, creating and editing a web page is more complicated. However, the amount and location of yellow table cells can be varied.

The table in the standard web page 700 shown in FIG. 28 can also be modified by using the third source code segment 712 shown in FIG. 29:

```
<table width="95%">
<tr><td>My Table Title</td></tr>
<tr><td>The quick <a href="brown.html">brown</a> <img src="fox.gif">fox</td></tr>
</table>
```

In this exemplary embodiment, the second table row includes both an anchor and an image. If the template tableRow1 were used, the resulting item will look just fine to someone reading the resulting Sparrow Web page. However, a user who tries to edit the second row of the table will see an editing region containing the HTML code (The quick <a href="brown.html">brown</a><img src="fox.gif">fox).

If the users to this page are familiar with HTML, this may be fine, because the user will have full control over the content of this table cell and can modify the HTML tags as such users desire. However, in the common case that some or all users do not want to see and edit HTML tags, this result is unsatisfactory. For this reason, in various exemplary embodiments, a custom template can be generated for table rows that takes into account the following:

1. The number of columns in the row.
2. Any attributes on the TD tags that begin each column.
3. The number and position of text tokens in each column.
4. The number and position of HTML tags in each column that map directly to Sparrow Web FIELD tags.
5. The number and position of HTML fragments containing other HTML tags.

Thus, a third template, tableRow3, might look like this:

```
<tr><td><input type="image" src="triangle.gif" name="Edit-0"></td>
<td><FIELD TYPE="TEXTAREA" NAME="text1"><FIELD TYPE="ANCHOR"
NAME="anchor2"><FIELD TYPE="TEXTAREA" NAME="text3"><FIELD
TYPE="IMAGE" NAME="image4"><FIELD TYPE="TEXTAREA"
NAME="text5"></td><tr>
```

This template specifies that a user editing this kind of item will be presented with a dialog box that contains three multi-line text editing areas, one interactor for specifying an anchor (HTML link) and one interactor for specifying the URL of image. Thus, the user will be able to edit all of the elements of the second row of the table in this exemplary embodiment, without needing to see or edit any HTML tags.

Figure 31:
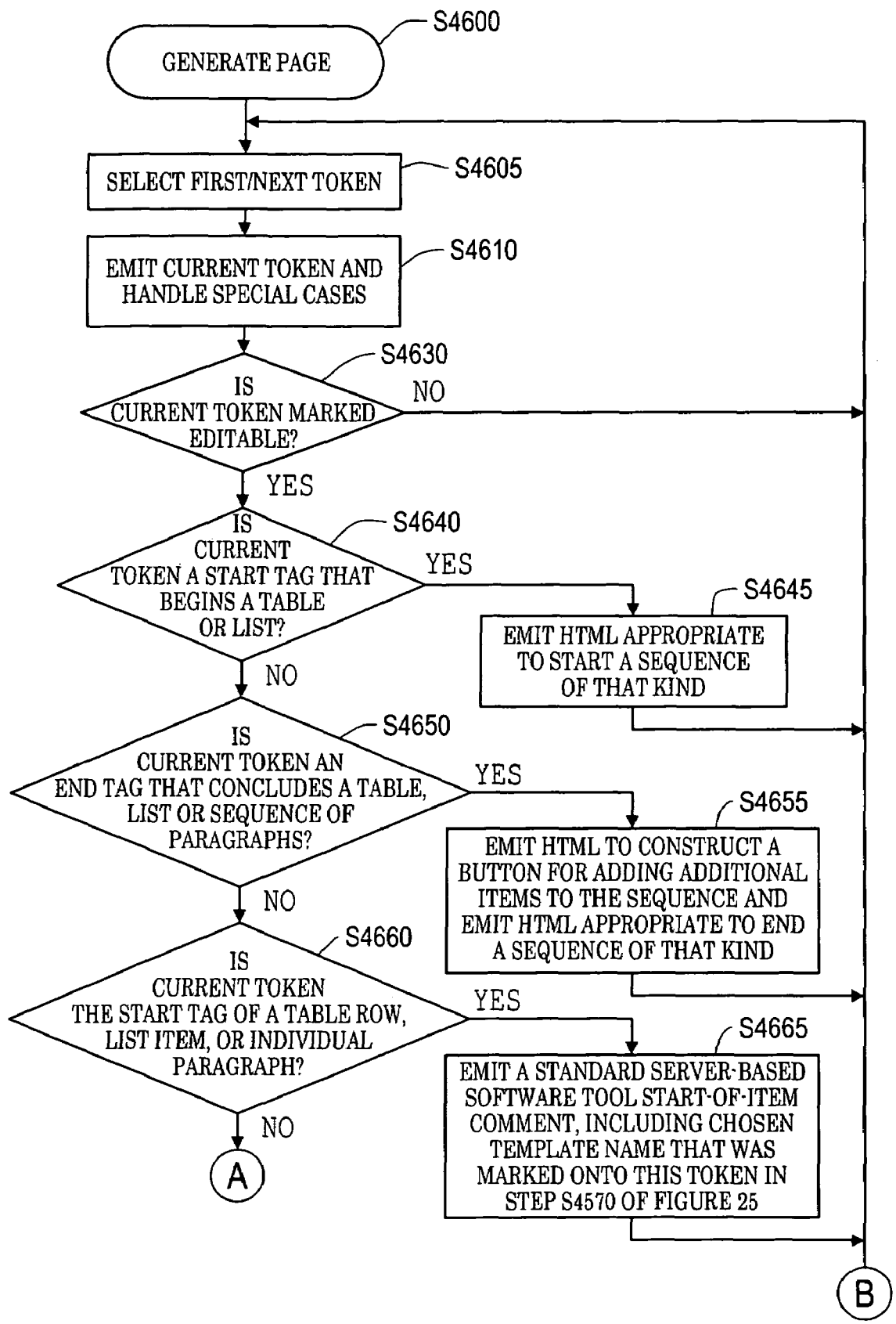
FIGS. 31 and 32 is a flowchart outlining in greater detail one exemplary embodiment of the method of FIG. 10 for generating a page according to this invention.
Figure 32:
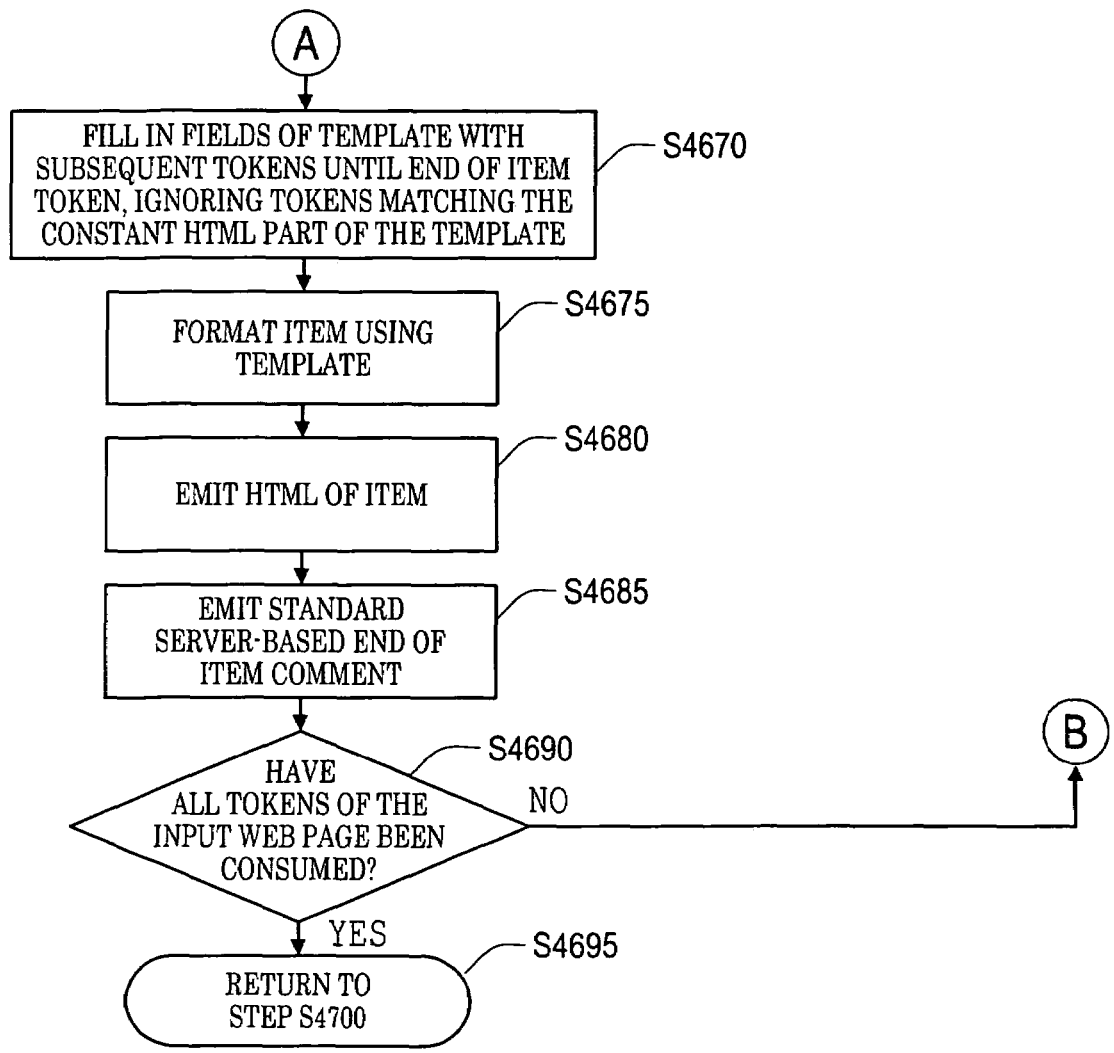

FIGS. 31 and 32 is a flowchart outlining in greater detail one exemplary embodiment of the method of FIG. 10 for generating a page in accordance with this invention. As shown in FIG. 31, operation of the method begins in step S4600 and continues to step S4605, where a first or next list token is selected as a current token. Then, in step S4610, the current token is emitted unchanged, because it is not part of an editable region, and special cases are handled. Next, in step S4630, a determination is made whether the current token is marked as editable (by previous steps described above). If not, operation jumps back to S4605. If so, operation proceeds to S4640.

In step S4640, a determination is made whether the current token begins an editable region such as, for example, the start tag of a table or the start tag of a list. If so, operation continues to step S4645. Otherwise, operation jumps to step S4650.

In step S4645, an HTML string is emitted that will properly begin the new editable region. This may be as simple as emitting the current token itself, which will be, for example, a <TABLE>tag, an<OL>, <UL>, or <DL> tag, or a <P> tag, with appropriate attributes, but may be different from the current token, for example, when emitting a <DIV> tag with a style attribute to achieve a desired indentation on an editable list. Operation then returns to S4605.

In contrast, in step S4650, a determination is made whether the current token is the end tag of an editable region, such as, for example, end of table, or end of list. If so, operation continues to step S4655. Otherwise, operation jumps to step S4660. In step S4655, HTML code is emitted that is appropriate to end an editable region. This HTML code generally defines a user-clickable button that will allow the user to add more items to those currently in this editable region. This HTML code also generally includes the current token itself, such as, for example, a </TABLE>, </UL>, </OL>, or </DL> tag, to appropriately bring the current table or list to an end. However, sequences of paragraphs may not require any final tags. Operation then jumps back to step S4605. In contrast, in step S4660, a determination is made whether the current token is the start tag of an editable region, such as, for example, a start of table row, a start of list item, or a start of paragraph. If so, operation continues to step S4665. Otherwise operation jumps to step S4670.

In step S4665, a standard server-based software tool start-of-item comment is emitted, including the chosen template name that was attached to the start tag token in FIG. 25. Operation then jumps back to step S4605. In contrast, in step S4670, fields of the template are filled in with subsequent tokens until the end of the item token, ignoring tokens matching the constant HTML part of the template. Operation then continues to step S4675.

In step S4675, each item is formatted using the template. Next, in step S4680, an HTML coding of the item is emitted. Then, in step S4685, a standard server-based end of the item comment is emitted. Operation then continues to step S4690.

In step S4690, a determination is made is any tokens from the input Web page remain to be processed. If so, operation jumps back to step S4605. Otherwise, operation continues to step S4695, where operation of the method returns to step S4700.

In many cases, these special handler routines only need to copy the corresponding HTML tag to the output stream and to initialize any data structures that will keep track of the processing of items in the sequence. However, in some cases, special HTML code elements will be emitted at these times as well. For example, in various exemplary embodiments, when converting lists where an editing button is to be placed "before" each item, the UL and /UL tags are replaced with <DIV STYLE="margin-left:40px"> and </DIV> tags, respectively, as a way to replace the normal bullets of the list with clickable "Edit" buttons. Also, at the end of a list, an additional button, in the shape of a plus sign (+), or any other form, can be placed that allows contributors to add new items to the list.

Figure 33:
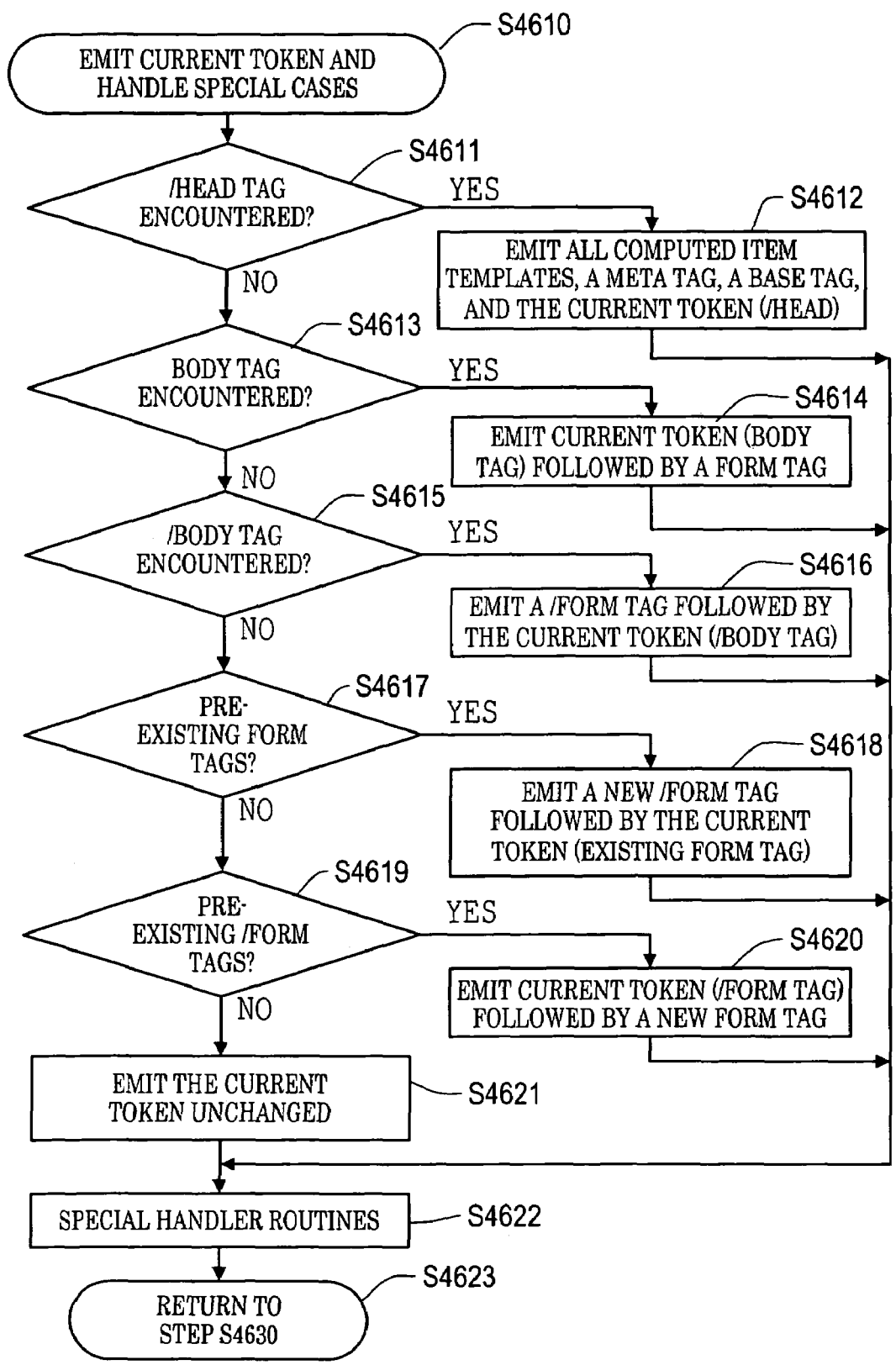
FIG. 33 is a flowchart outlining in greater detail one exemplary embodiment of the method of FIGS. 31 and 32 for emitting current tokens and handling special cases according to this invention.

FIG. 33 is a flowchart outlining in greater detail one exemplary embodiment of the method for emitting a current token and handling special cases. As shown in FIG. 33, operation of the method begins in step S4610, and continues to step S4611, where, for the current token, a determination is made whether the current token is a /HEAD tag. If so, operation continues to step S4612. Otherwise operation jumps to step S4613.

In step S4612, all computed item templates, a META tag instructing the browser not to cache this page, a BASE tag to aid the use of relative URLs throughout the page, and the /HEAD tag that brings the HEAD section of the output page to a close are emitted. Operation then jumps to step S4622. In contrast, in step S4613, for the current token, a determination is made whether a BODY tag is encountered. If so, operation continues to step . Otherwise, operation jumps to step S4615.

In step S4614, the current token, which is typically a BODY tag that starts the body, that is the visible content, section of the output HTML page is emitted followed by a FORM tag whose ACTION attribute is the URL of the Sparrow Web server. Operation then again jumps to step S4622. In contrast, in step S4615, for the current token, a determination is made whether a /BODY tag is encountered. If so, operation continues to step S4616. Otherwise operation jumps to step S4617.

In step S4616 a /FORM tag is emitted followed by the current token itself, which typically is a /BODY tag. Together, these two emitted tags bring to a close the FORM that directs actions to the Sparrow Web server and the content body of the output Web page. Operation then jumps to step S4622. In contrast, in step S4617, for the current token, a determination is made whether the current token is a preexisting FORM tag. If so, operation continues to step S4618. Otherwise operation jumps to step S4619.

In step S4618, a /FORM tag to bring to temporarily disable the effects of the FORM that sends actions to the Sparrow Web server, so that the pre-existing form may continue to function, is emitted followed by the current token, i.e., the pre-existing FORM tag. Operation then again jumps to step S4622. In contrast, in step S4619, for the current token, a determination is made whether the current token is a pre-existing /FORM tag. If so, operation continues to step S4620. Otherwise, operation jumps to step S4621.

In step S4620, the current token, which is typically a pre-existing /FORM tag, is emitted followed by an additional FORM tag is that directs actions to the Sparrow Web server, so content outside of the pre-existing forms will all be set up to interact with Sparrow Web. Operation then again jumps to step S4622. In contrast, in step S4621, the current token is emitted unchanged, as the current token is not one of the kinds of token for which special processing is needed. Operation then continues to S4622.

In step S4622, special handler routines update system data structures as needed based on the content of the current token. Operation then continues to step S4623, where operation of the method returns to step S4630.

In a parse tree data structure, the methods described above operate on an array of tokens. The tree structure of the tokens is represented implicitly by the nesting structure of beginning and ending tags, and in this case, by keeping a stack of tag contexts during each pass. An alternative exemplary embodiment would be to construct the tree explicitly. In that case, the methods would walk the tree.

Figure 34:
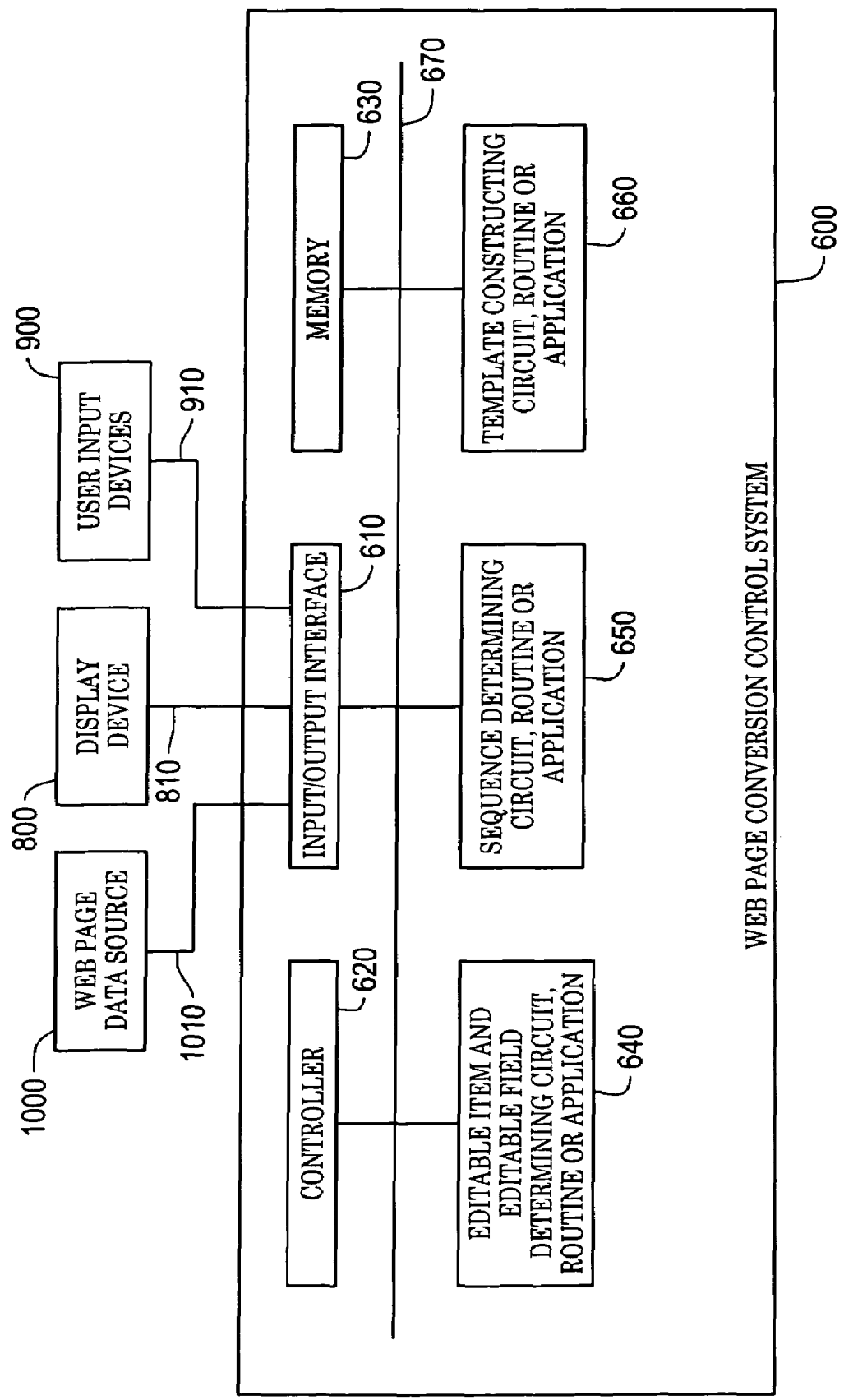
FIG. 34 is a block diagram outlining one exemplary embodiment of a system for converting a standard web page into a Sparrow-ready web page.

FIG. 34 is a block diagram outlining one exemplary embodiment of a web page conversion system 600 according this invention. As shown in FIG. 34, the web page conversion system 600 includes an input/output interface 610, a controller 620, a memory 630, an edible item/field determining circuit, routine or application 640, a sequence determining circuit, routine or application 650, and a template constructing circuit, routine or application 660, each appropriately interconnected by one or more control and/or data busses and/or application programming interface 670. The input/output interface 610 is linked to the web page data source 1000 by a link 1010. The input/output interface 610 is also linked to a display device 800 by a link 810, and one or more user input devices 900 by one or more links 910.

Each of the links 810, 910 and 1010 can be any known or later-developed connection system or structure usable to connect their respective devices to the web page conversion system 600. It should also be understood that links 810, 910 and 1010 do not need to be of the same type.

The memory 630 can be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The input/output interface 610 is connected to the user input devices 900 over the link 910. The user input devices 900 can be one or more of a touch pad, a touch screen, a track ball, a mouse, a keyboard or any known or later-developed user input devices 900 for inputting data and/or control signals to the web page conversion system 600 to convert an input web page to a converted Sparrowized Web page.

Furthermore, the input/output interface 610 is connected to the display device 800 over the link 810. In general, the display device 800 can be any device that is capable of outputting the input web page, the converted Sparrowized web page, the "What to convert?" menu and any error message according to the method and the web page conversion system 600 of the exemplary embodiments.

The input/output interface 610 is also connected to a web page data source 1000 over link 1010. In general, the web page data source 1000 can be any device that is capable of inputting web page data that is to be converted according to the method and the web page conversion system 600 of the exemplary embodiments.

The editable item/field determining circuit, routine or application 640 inputs a user input, inputs the identified web page and determines which types of items are to be made editable. The sequence determining circuit, routine or application 650 determines a sequence of list items, table rows or paragraphs. The template constructing circuit, routine or application 660 determines how the edible item in the document will be formatted and displayed, which user interface interactors will be provided to edit the fields of the edible item, and how new items to the same type will be formatted and displayed when the new items are created.

In operation, user input is input from the user input device(s) 900 over the link 910 by the input/output interface 610 of the web page conversion control system 600. The user input includes information regarding one or more of the source of the web page to be edited, the type of web page elements to be edited, the location of where editing icons are to be placed and/or the location for the converted output web page. The user input information is then stored in the memory 630 under control of the controller 620. A web page data is input from the web page data source 1000 over the link 1010 to the input/output interface 610 in accordance with the user input. The web page data including the web page source code is also stored into the memory 630 under control of the controller 620.

The edible item/field determining circuit, routine or application 640, under control of the controller 620, inputs the web page data. The edible item/field determining circuit, routine or application 640 augments the web page source code to form an augmented web page source code that is in conformance to a coding standard. The edible item/field determining circuit, routine or application 640, under control of the controller 620, then stores the augmented web page source code in the memory 630. The edible item/field determining circuit, routine or application 640 determines the type of web page elements to be converted and sets a value of a conversion flag associated with each of one or more types of web page elements to be edited that have previously been selected by the user input. The edible item/field determining circuit, routine or application 640 also stores the value of the set conversion flag in the memory 630 under control of the controller 620.

The edible item/field determining circuit, routine or application 640 also determines the locations where the editing icons are to be placed and sets a value of a placement flag associated with the location previously selected by the user input. The edible item/field determining circuit, routine or application 640 then stores the value of the set placement flag in the memory 630 under control of the controller 620. The edible item/field determining circuit, routine or application 640 parses the augmented web page source code and converts the parsed augmented web page source code to an editable web page code based on the value of the set conversion flags. The edible item/field determining circuit, routine or application 640 also stores the parsed web page code and converted editable web page code in the memory 630 under control of the controller 620 and/or outputs the parsed web page code and converted editable web page code directly to the sequence determining circuit, routine or application 650 and the template constructing circuit, routine or application 660.

The sequence determining circuit, routine or application 650, under control of the controller 620, inputs the parsed web page code and converted web page code from the memory 630 or directly from the edible item/field determining circuit, routine or application 640. The sequence determining circuit, routine or application 650 determines a sequence of list items, table rows or paragraphs. Then, the sequence determining circuit, routine or application 650 marks and/or indicates where each sequence of items, of a sequence of list items, a sequence of table rows and/or a sequence of paragraphs begins and/or ends. The determination of the beginning and/or ending of each sequence of items is used to indicate where editing buttons should be located in constructing a template. The sequence determining circuit, routine or application 650 also stores, under control of the controller 620, the beginning and ending of these sequences in the memory 630 under control of the controller 620 and/or outputs the beginning and ending of these sequences directly to the template constructing circuit, routine or application 660.

The template constructing circuit, routine or application 660 under control of the controller 620, inputs the parsed web page code and converted editable web page code from the memory 630 or directly from the edible item/field determining circuit, routine or application 640, and inputs code indicating the beginning and ending of these sequences from the memory 630 or directly from the sequence determining circuit, routine or application 650. The template constructing circuit, routine or application 660 determines the variable contents to be edited and the fixed parts for each identified editable item. Then, the template constructing circuit, routine or application 660 creates a template for the editable item(s). The template constructing circuit, routine or application 660 also generates a hash key or unique identifier for all of the variable contents and the fixed parts. The template constructing circuit, routine or application 660 determines, for each template, whether the template is stored in a hash table in the memory 630.

If the template constructing circuit, routine or application 660 determines that the template is not stored in the hash table, the template constructing circuit, routine or application 660 associates, under control of the controller 620, the new template with a chosen template name and stores the template in the memory 630 under control of the controller 620. If the template has previously been stored in the memory 630, the template will not be stored again. Then, the template constructing circuit, routine or application 660 outputs, under control of the controller 630, the converted editable web page, based on the converted editable web page code and the templates web page, via the input/output interface 610 to the display device 800 to display the output document.

In formats other than Sparrow Web, exemplary embodiments similar to those exemplary embodiments of the systems and methods according to this invention described herein could be targeted at other systems that allow structured contributions to Web pages. For example, items found in the Web page could be turned into XML structures to be formatted using the Zope® Page Template language.

It should be appreciated that, in various exemplary embodiments, in recognizing other HTML structures, the systems and methods of this invention can be applied to other technologies for recognizing repetitive structures in HTML pages that are not explicitly encoded in HTML list, table, or paragraph tags. For example, items in list-like structures in HTML pages, however they may be represented in HTML tags, can be made editable.

It should be appreciated that, in various exemplary embodiments, in further interactions with the users, many other decisions can be made by the user as part of a new Web page created using the systems and methods of this invention. For example, if a piece of text in an item is bold in the original page, there is a question whether a <b> tag should be built into the template for that item (under control of the page author), whether a FIELD type should be used that allows the contributor to turn boldness on and off, or whether the tag should be ignored. Various exemplary embodiments of the systems and methods of this invention can allow the user to make these decisions, can provide the user with a preview of the new Sparrow Web page that highlights the effects of these decisions, and/or can allow the user to cycle through the choices.

While this invention has been described in conjunction with the exemplary embodiments outlined above, it is evidenced that many alternative, modifications and variations will be apparent to those skilled in the art. Accordingly, the exemplary embodiments of the invention, as set forth above, are intended to be illustrative, not limiting. Various changes may be made without departing form the spirit and scope of the invention.

What is claimed is:

1. A method for automatically converting documents expressed in a markup language to structured shared writeable and editable documents, comprising:
   inputting, using a computer, a first document having a first document coding expressed in a markup language;
   inputting, using the computer, conversion parameters usable to convert the first document into a second document by selecting which types of content in the first document are to become sequences of editable items, selecting options that determine the content of a template that will be constructed and applied to the editable items by selecting a location in the template for an editing icon relative to other visible elements of the template and setting an editing icon placement flag according to the selected location;
   converting, using the computer, the first document into the second document having a second document coding expressed in a markup language by identifying at least one region of content of the first document as an editable item and identifying at least one sub-region of the at least one region as an editable field;
   constructing, using the computer, a template describing how each editable item in the second document will be formatted and displayed;
   outputting, on the computer, the second document containing content of the first document and one or more selected content icons by identifying at least one beginning and at least one ending of at least one sequence of editable items and adding, removing, or modifying markup language elements at at least some of the at least one beginning and the at least one ending of the at least one sequence,
   wherein the converting of the first document into the second document includes:
      detecting, and, if necessary, revising the first document coding on the computer;
      parsing the first document coding, as revised if necessary, into tokens on the computer;
      marking as editable at least some of said tokens of the parsed first document coding based on the value of the conversion flag and on the relative order of the markup language elements on the computer;
      determining which of the at least one sub-region of the at least one region is the editable field within the at least one editable item based on determined factors on the computer;
      constructing at least one template for the at least one editable item based on the determined editable field and determining how new editable items having the same type of item content to be converted will be formatted and displayed when the new editable items are created on the computer;
      placing the editing icon in the at least one template based on the value of the set placement flag on the computer; and
      generating the second document based on the at least one constructed template on the computer.

2. The method of claim 1, wherein marking as editable some number of the tokens comprises:
   labeling the token according to the type of item sequence to be converted and a location of the token within the type of item sequence, where the type of item sequence to be converted includes at least a table, list, sequence of paragraphs, or other type of document regions;

counting children of item sequences that are of the type to be converted;

propagating child counts of the item sequences;

marking, as non-editable, some of the lists, tables, and paragraphs based on the content and relative order of the respective lists, tables, and paragraphs; and marking existing forms, within the first document, as document regions with preserved existing functionality.

3. The method of claim 2, wherein counting children comprises:

counting, for each table, a number of rows in that table and, for each list, a number of list items in that list;

storing the number of rows in a start tag token of that table or the number of list items in a start tag token of that list as a child count for that table or that list, respectively;

marking start row tags in each table with a number of columns in each of the rows;

extracting a string representation of each column tag;

attaching, to each start row tag token, a list of the string representations for the column tags that occur within that start row tag token's corresponding table row;

finding, for each token, the maximum child count of all of the child counts stored in the start tag token of each of the tables that include that token and storing the maximum child count as that token's parent table count;

finding, for each list, all tables that contain that list, and storing as the child list count of each such table the child count of that list, but only if doing so will make the child list count of the table larger;

finding, for each nested table, all surrounding tables that contain that table, and storing as the child table count of each such surrounding table the child count of the nested table, but only if doing so will make the child table count of the surrounding table larger;

counting, for each paragraph, a number of non-empty text tokens in that paragraph; and marking a paragraph start tag for that paragraph with the number of non-empty text tokens.

4. The method of claim 2, wherein propagating child counts comprises:

selecting, in turn, each of the tokens of the page;

storing, with each token that is part of a list, the child count that has been computed for the start tag token of that token's tightest enclosing list;

storing, with each token that is part of a table, the child count, child table count, and child list count that has been computed for the start tag token of that token's tightest enclosing table; and storing, with each token that is part of a paragraph, the child count that has been determined for the start tag token of that paragraph.

5. The method of claim 2, wherein marking, as non-editable, some of the tables, lists, and paragraphs comprises:

finding all tokens that are in a table and are marked editable, and selecting, in turn, each such token;

marking the token as non-editable if that token's child count is less than 2;

marking the token as non-editable if that token's child table count is greater than 1; and marking the token as non-editable if both that token's child list count is greater than 1 and a user has requested that lists should be made editable in preference to tables.

6. The method of claim 2, wherein marking, as non-editable, some of the tables, lists, and paragraphs further comprises:

determining the value of the set conversion flag;

selecting, in turn, all tokens that are part of a list if the value indicates that tables and lists with tables preferred is the type of item content to be converted; and marking the token as non-editable if that token's parent table count is greater than 1 and the value indicates that tables and lists with tables preferred is the type of item content to be converted.

7. The method of claim 2, wherein marking the existing forms includes:

finding all tokens that are inside of an initial form, including the start tag tokens and end tag tokens of each such form; and marking all such tokens as non-editable.

8. The method of claim 2, wherein determining the templates includes:

finding each item, in turn, that is marked as editable;

determining variable parts of the template that should be editable by examining the current text and the tags of the item;

determining fixed parts of the template that should remain non-editable by examining the text and the tags of the item;

determining a unique identifier, the variable contents and the fixed parts of the template;

determining if a template has already been associated with that unique identifier in a template table of previously computed templates; and determining a new template based on the variable contents and the fixed parts, if no previously computed template is found for this unique identifier, and associating the newly determined template with the unique identifier in the template table.

* * * * *